(12) United States Patent
Greene et al.

(10) Patent No.: US 8,594,584 B2
(45) Date of Patent: Nov. 26, 2013

(54) METHOD AND APPARATUS FOR TUNING A COMMUNICATION DEVICE

(75) Inventors: Matthew R. Greene, Crystal Lake, IL (US); Keith R. Manssen, Bull Valley, IL (US); Gregory Mendolia, Nashua, NH (US)

(73) Assignee: Blackberry Limited, Waterloo (CA)

( * ) Notice: Subject to any disclaimer, the term of this patent is extended or adjusted under 35 U.S.C. 154(b) by 311 days.

(21) Appl. No.: 13/108,463

(22) Filed: May 16, 2011

(65) Prior Publication Data

US 2012/0295554 A1 Nov. 22, 2012

(51) Int. Cl.
*H04B 1/40* (2006.01)

(52) U.S. Cl.
USPC ......... 455/77; 455/41.2; 455/67.11; 455/121; 455/129; 455/193.1; 333/32; 333/17.3; 343/853; 343/860; 343/787; 343/745; 375/135

(58) Field of Classification Search
USPC ............ 455/41.2, 67.11, 121, 77, 129, 193.1; 333/32, 17.3; 343/853, 860, 787, 745; 375/135
See application file for complete search history.

(56) References Cited

U.S. PATENT DOCUMENTS

| | | | |
|---|---|---|---|
| 2,745,067 A | 5/1956 | True | |
| 3,117,279 A | 1/1964 | Ludvigson | |
| 3,160,832 A | 12/1964 | Beitman | |
| 3,390,337 A | 6/1968 | Beitman | |
| 3,443,231 A | 5/1969 | Roza | |
| 3,509,500 A | 4/1970 | McNair | |
| 3,571,716 A | 3/1971 | Hill | |
| 3,590,385 A | 6/1971 | Sabo | |
| 3,601,717 A | 8/1971 | Kuecken | |
| 3,794,941 A | 2/1974 | Templin | |
| 3,919,644 A | 11/1975 | Smolka | |
| 3,990,024 A | 11/1976 | Hou | |
| 3,995,237 A | 11/1976 | Brunner | |

(Continued)

FOREIGN PATENT DOCUMENTS

| | | |
|---|---|---|
| DE | 1614655 | 10/1997 |
| DE | 102008050743 | 4/2010 |

(Continued)

OTHER PUBLICATIONS

Patent Cooperation Treaty, "International Search Report and Written Opinion", International Application No. PCT/US2010/056413, Jul. 27, 2011.

(Continued)

*Primary Examiner* — April G Gonzales
(74) *Attorney, Agent, or Firm* — Guntin Gust, PLC; Andrew Gust

(57) ABSTRACT

A system that incorporates teachings of the present disclosure may include, for example, a tuning system for a communication device having an antenna, where the tuning system includes at least one first tunable element connected with at least one radiating element of the antenna for tuning the antenna where the adjusting of the at least one first tunable element is based on at least one of a use case associated with the communication device and location information associated with the communication device, and a matching network having at least one second tunable element coupled at a feed point of the antenna, wherein the matching network receives control signals for adjusting the at least one second tunable element to tune the matching network. Additional embodiments are disclosed.

22 Claims, 13 Drawing Sheets

(56) References Cited

U.S. PATENT DOCUMENTS

| | | |
|---|---|---|
| 4,186,359 A | 1/1980 | Kaegebein |
| 4,201,960 A | 5/1980 | Skutta |
| 4,227,256 A | 10/1980 | O'Keefe |
| 4,383,441 A | 5/1983 | Willis |
| 4,476,578 A | 10/1984 | Gaudin |
| 4,493,112 A | 1/1985 | Bruene |
| 4,777,490 A | 10/1988 | Sharma |
| 4,799,066 A | 1/1989 | Deacon |
| 4,965,607 A | 10/1990 | Wilkins |
| 4,980,656 A | 12/1990 | Duffalo |
| 5,032,805 A | 7/1991 | Elmer |
| 5,142,255 A | 8/1992 | Chang |
| 5,177,670 A | 1/1993 | Shinohara |
| 5,195,045 A | 3/1993 | Keane |
| 5,200,826 A | 4/1993 | Seong |
| 5,212,463 A | 5/1993 | Babbitt |
| 5,243,358 A | 9/1993 | Sanford |
| 5,258,728 A | 11/1993 | Taniyoshi |
| 5,276,912 A | 1/1994 | Siwiak |
| 5,301,358 A | 4/1994 | Gaskill |
| 5,307,033 A | 4/1994 | Koscica |
| 5,310,358 A | 5/1994 | Johnson |
| 5,312,790 A | 5/1994 | Sengupta |
| 5,334,958 A | 8/1994 | Babbitt |
| 5,371,473 A | 12/1994 | Trinh |
| 5,409,889 A | 4/1995 | Das |
| 5,427,988 A | 6/1995 | Sengupta |
| 5,430,417 A | 7/1995 | Martin |
| 5,446,447 A | 8/1995 | Carney |
| 5,448,252 A | 9/1995 | Ali |
| 5,451,567 A | 9/1995 | Das |
| 5,451,914 A | 9/1995 | Stengel |
| 5,457,394 A | 10/1995 | McEwan |
| 5,472,935 A | 12/1995 | Yandrofski |
| 5,479,139 A | 12/1995 | Koscica |
| 5,486,491 A | 1/1996 | Sengupta |
| 5,496,795 A | 3/1996 | Das |
| 5,502,372 A | 3/1996 | Quan |
| 5,524,281 A | 6/1996 | Bradley |
| 5,548,837 A | 8/1996 | Hess et al. |
| 5,561,407 A | 10/1996 | Koscica |
| 5,564,086 A | 10/1996 | Cygan |
| 5,589,844 A | 12/1996 | Belcher et al. |
| 5,593,495 A | 1/1997 | Masuda |
| 5,635,433 A | 6/1997 | Sengupta |
| 5,635,434 A | 6/1997 | Sengupta |
| 5,640,042 A | 6/1997 | Koscica |
| 5,679,624 A | 10/1997 | Das |
| 5,689,219 A | 11/1997 | Piirainen |
| 5,693,429 A | 12/1997 | Sengupta |
| 5,694,134 A | 12/1997 | Barnes |
| 5,699,071 A | 12/1997 | Urakami et al. |
| 5,721,194 A | 2/1998 | Yandrofski |
| 5,766,697 A | 6/1998 | Sengupta et al. |
| 5,777,581 A | 7/1998 | Lilly |
| 5,778,308 A | 7/1998 | Sroka |
| 5,786,727 A | 7/1998 | Sigmon |
| 5,812,572 A | 9/1998 | King |
| 5,812,943 A | 9/1998 | Suzuki |
| 5,830,591 A | 11/1998 | Sengupta |
| 5,846,893 A | 12/1998 | Sengupta |
| 5,874,926 A | 2/1999 | Tsuru |
| 5,880,635 A | 3/1999 | Satoh |
| 5,886,867 A | 3/1999 | Chivukula |
| 5,892,482 A | 4/1999 | Coleman et al. |
| 5,929,717 A | 7/1999 | Richardson |
| 5,963,871 A | 10/1999 | Zhinong |
| 5,969,582 A | 10/1999 | Boesch |
| 5,982,099 A | 11/1999 | Barnes |
| 5,990,766 A | 11/1999 | Zhang |
| 6,009,124 A | 12/1999 | Smith |
| 6,020,787 A | 2/2000 | Kim |
| 6,020,795 A | 2/2000 | Kim |
| 6,029,075 A | 2/2000 | Das |
| 6,045,932 A | 4/2000 | Jia |
| 6,061,025 A | 5/2000 | Jackson |
| 6,074,971 A | 6/2000 | Chiu |
| 6,096,127 A | 8/2000 | Dimos |
| 6,100,733 A | 8/2000 | Dortu |
| 6,101,102 A | 8/2000 | Brand |
| 6,115,585 A | 9/2000 | Matero |
| 6,133,883 A | 10/2000 | Munson |
| 6,172,385 B1 | 1/2001 | Duncombe |
| 6,215,644 B1 | 4/2001 | Dhuler |
| 6,242,989 B1 | 6/2001 | Barber |
| 6,281,748 B1 | 8/2001 | Klomsdorf et al. |
| 6,281,847 B1 | 8/2001 | Lee |
| 6,343,208 B1 | 1/2002 | Ying |
| 6,377,142 B1 | 4/2002 | Chiu |
| 6,377,217 B1 | 4/2002 | Zhu |
| 6,377,440 B1 | 4/2002 | Zhu |
| 6,384,785 B1 | 5/2002 | Kamogawa |
| 6,404,614 B1 | 6/2002 | Zhu |
| 6,408,190 B1 | 6/2002 | Ying |
| 6,414,562 B1 | 7/2002 | Bouisse |
| 6,415,562 B1 | 7/2002 | Donaghue |
| 6,452,776 B1 | 9/2002 | Chakravorty |
| 6,461,930 B2 | 10/2002 | Akram |
| 6,466,774 B1 | 10/2002 | Okabe |
| 6,492,883 B2 | 12/2002 | Liang |
| 6,514,895 B1 | 2/2003 | Chiu |
| 6,525,630 B1 | 2/2003 | Zhu |
| 6,531,936 B1 | 3/2003 | Chiu |
| 6,535,076 B2 | 3/2003 | Partridge |
| 6,535,722 B1 | 3/2003 | Rosen |
| 6,538,603 B1 | 3/2003 | Chen |
| 6,556,102 B1 | 4/2003 | Sengupta |
| 6,556,814 B1 | 4/2003 | Klomsdorf |
| 6,570,462 B2 | 5/2003 | Edmonson |
| 6,590,468 B2 | 7/2003 | du Toit et al. |
| 6,590,541 B1 | 7/2003 | Schultze |
| 6,597,265 B2 | 7/2003 | Liang |
| 6,608,603 B2 | 8/2003 | Alexopoulos |
| 6,624,786 B2 | 9/2003 | Boyle |
| 6,640,085 B1 | 10/2003 | Chatzipetros |
| 6,657,595 B1 | 12/2003 | Phillips et al. |
| 6,661,638 B2 | 12/2003 | Jackson et al. |
| 6,670,256 B2 | 12/2003 | Yang |
| 6,710,651 B2 | 3/2004 | Forrester |
| 6,724,611 B1 | 4/2004 | Mosley |
| 6,724,890 B1 | 4/2004 | Bareis |
| 6,737,179 B2 | 5/2004 | Sengupta |
| 6,759,918 B2 | 7/2004 | Du Toit |
| 6,765,540 B2 | 7/2004 | Toncich |
| 6,768,472 B2 | 7/2004 | Alexopoulos |
| 6,774,077 B2 | 8/2004 | Sengupta |
| 6,795,712 B1 | 9/2004 | Vakilian |
| 6,825,818 B2 | 11/2004 | Toncich |
| 6,839,028 B2 | 1/2005 | Lee |
| 6,845,126 B2 | 1/2005 | Dent |
| 6,859,104 B2 | 2/2005 | Toncich |
| 6,862,432 B1 | 3/2005 | Kim |
| 6,864,757 B2 | 3/2005 | Du Toit |
| 6,868,260 B2 | 3/2005 | Jagielski |
| 6,888,714 B2 | 5/2005 | Shaw |
| 6,905,989 B2 | 6/2005 | Ellis |
| 6,907,234 B2 | 6/2005 | Karr |
| 6,920,315 B1 | 7/2005 | Wilcox |
| 6,943,078 B1 | 9/2005 | Zheng |
| 6,946,847 B2 | 9/2005 | Nishimori |
| 6,949,442 B2 | 9/2005 | Barth |
| 6,961,368 B2 | 11/2005 | Dent |
| 6,964,296 B2 | 11/2005 | Memory |
| 6,965,837 B2 | 11/2005 | Vintola |
| 6,993,297 B2 | 1/2006 | Smith |
| 7,009,455 B2 | 3/2006 | Toncich |
| 7,071,776 B2 | 7/2006 | Forrester |
| 7,106,715 B1 | 9/2006 | Kelton |
| 7,107,033 B2 | 9/2006 | D du Toit |
| 7,113,614 B2 | 9/2006 | Rhoads |
| 7,151,411 B2 | 12/2006 | Martin |
| 7,176,634 B2 | 2/2007 | Kitamura et al. |
| 7,176,845 B2 | 2/2007 | Fabrega-Sanchez |
| 7,180,467 B2 | 2/2007 | Fabrega-Sanchez |

(56) References Cited

U.S. PATENT DOCUMENTS

| | | | |
|---|---|---|---|
| 7,221,327 B2* | 5/2007 | Toncich | 343/860 |
| 7,298,329 B2 | 11/2007 | Diament | |
| 7,312,118 B2 | 12/2007 | Kiyotoshi | |
| 7,332,980 B2 | 2/2008 | Zhu | |
| 7,332,981 B2 | 2/2008 | Matsuno | |
| 7,339,527 B2 | 3/2008 | Sager | |
| 7,426,373 B2 | 9/2008 | Clingman | |
| 7,427,949 B2 | 9/2008 | Channabasappa et al. | |
| 7,468,638 B1 | 12/2008 | Tsai | |
| 7,535,080 B2 | 5/2009 | Zeng et al. | |
| 7,535,312 B2 | 5/2009 | McKinzie | |
| 7,539,527 B2 | 5/2009 | Jang | |
| 7,596,357 B2 | 9/2009 | Nakamata | |
| 7,633,355 B2 | 12/2009 | Matsuo | |
| 7,667,663 B2 | 2/2010 | Hsiao | |
| 7,705,692 B2 | 4/2010 | Fukamachi et al. | |
| 7,714,676 B2 | 5/2010 | McKinzie | |
| 7,714,678 B2 | 5/2010 | du Toit | |
| 7,728,693 B2 | 6/2010 | du Toit | |
| 7,768,400 B2 | 8/2010 | Lawrence et al. | |
| 7,786,819 B2 | 8/2010 | Ella | |
| 7,795,990 B2 | 9/2010 | du Toit | |
| 7,907,094 B2 | 3/2011 | Kakitsu et al. | |
| 7,917,104 B2 | 3/2011 | Manssen et al. | |
| 7,949,309 B2* | 5/2011 | Rofougaran et al. | 455/77 |
| 7,969,257 B2 | 6/2011 | du Toit | |
| 7,991,363 B2 | 8/2011 | Greene | |
| 8,112,043 B2 | 2/2012 | Knudsen et al. | |
| 8,170,510 B2 | 5/2012 | Knudsen et al. | |
| 8,190,109 B2 | 5/2012 | Ali et al. | |
| 8,204,446 B2* | 6/2012 | Scheer et al. | 455/67.11 |
| 8,217,732 B2 | 7/2012 | McKinzie | |
| 8,299,867 B2 | 10/2012 | McKinzie | |
| 8,320,850 B1 | 11/2012 | Khlat | |
| 2002/0008672 A1 | 1/2002 | Gothard et al. | |
| 2002/0030566 A1 | 3/2002 | Bozler | |
| 2002/0109642 A1 | 8/2002 | Gee et al. | |
| 2002/0118075 A1 | 8/2002 | Ohwada | |
| 2002/0145483 A1 | 10/2002 | Bouisse | |
| 2002/0167963 A1 | 11/2002 | Joa-Ng | |
| 2002/0187780 A1 | 12/2002 | Souissi | |
| 2002/0191703 A1 | 12/2002 | Ling | |
| 2002/0193088 A1 | 12/2002 | Jung | |
| 2003/0060227 A1 | 3/2003 | Sekine | |
| 2003/0071300 A1 | 4/2003 | Yashima | |
| 2003/0114124 A1 | 6/2003 | Higuchi | |
| 2003/0142022 A1 | 7/2003 | Ollikainen | |
| 2003/0193997 A1 | 10/2003 | Dent | |
| 2003/0199286 A1 | 10/2003 | D du Toit | |
| 2003/0210206 A1 | 11/2003 | Phillips | |
| 2003/0232607 A1 | 12/2003 | Le Bars | |
| 2004/0009754 A1 | 1/2004 | Smith | |
| 2004/0090372 A1 | 5/2004 | Nallo | |
| 2004/0100341 A1 | 5/2004 | Luetzelschwab | |
| 2004/0127178 A1 | 7/2004 | Kuffner | |
| 2004/0137950 A1 | 7/2004 | Bolin | |
| 2004/0202399 A1 | 10/2004 | Kochergin | |
| 2004/0257293 A1 | 12/2004 | Friedrich | |
| 2005/0007291 A1 | 1/2005 | Fabrega-Sanchez | |
| 2005/0032488 A1 | 2/2005 | Pehlke | |
| 2005/0032541 A1 | 2/2005 | Wang | |
| 2005/0042994 A1 | 2/2005 | Otaka | |
| 2005/0059362 A1 | 3/2005 | Kalajo | |
| 2005/0082636 A1 | 4/2005 | Yashima | |
| 2005/0085204 A1 | 4/2005 | Poilasne et al. | |
| 2005/0093624 A1 | 5/2005 | Forrester et al. | |
| 2005/0130608 A1 | 6/2005 | Forse | |
| 2005/0130699 A1 | 6/2005 | Kim | |
| 2005/0208960 A1 | 9/2005 | Hassan | |
| 2005/0215204 A1 | 9/2005 | Wallace | |
| 2005/0264455 A1 | 12/2005 | Talvitie | |
| 2005/0282503 A1 | 12/2005 | Onno | |
| 2006/0003537 A1 | 1/2006 | Sinha | |
| 2006/0009165 A1 | 1/2006 | Alles | |
| 2006/0160501 A1 | 7/2006 | Mendolia | |
| 2006/0183433 A1 | 8/2006 | Mori | |
| 2006/0183442 A1* | 8/2006 | Chang et al. | 455/121 |
| 2006/0205368 A1 | 9/2006 | Bustamante | |
| 2006/0281423 A1 | 12/2006 | Caimi | |
| 2007/0013483 A1 | 1/2007 | Stewart | |
| 2007/0035458 A1 | 2/2007 | Ohba | |
| 2007/0042725 A1 | 2/2007 | Poilasne | |
| 2007/0042734 A1 | 2/2007 | Ryu | |
| 2007/0063788 A1* | 3/2007 | Zhu et al. | 333/32 |
| 2007/0080888 A1 | 4/2007 | Mohamadi | |
| 2007/0082611 A1 | 4/2007 | Terranova | |
| 2007/0085609 A1 | 4/2007 | Itkin | |
| 2007/0111681 A1 | 5/2007 | Alberth et al. | |
| 2007/0142014 A1 | 6/2007 | Wilcox | |
| 2007/0149146 A1 | 6/2007 | Hwang | |
| 2007/0182636 A1 | 8/2007 | Carlson | |
| 2007/0184825 A1 | 8/2007 | Lim et al. | |
| 2007/0194859 A1 | 8/2007 | Brobston | |
| 2007/0197180 A1 | 8/2007 | McKinzie et al. | |
| 2007/0200766 A1 | 8/2007 | McKinzie | |
| 2007/0285326 A1 | 12/2007 | McKinzie | |
| 2007/0293176 A1 | 12/2007 | Yu | |
| 2008/0007478 A1 | 1/2008 | Jung | |
| 2008/0018541 A1 | 1/2008 | Pang | |
| 2008/0055016 A1 | 3/2008 | Morris | |
| 2008/0081670 A1 | 4/2008 | Rofougaran | |
| 2008/0106350 A1 | 5/2008 | McKinzie | |
| 2008/0122553 A1 | 5/2008 | McKinzie | |
| 2008/0122723 A1 | 5/2008 | Rofougaran | |
| 2008/0129612 A1 | 6/2008 | Wang | |
| 2008/0158076 A1 | 7/2008 | Walley | |
| 2008/0261544 A1 | 10/2008 | Blin | |
| 2008/0274706 A1 | 11/2008 | Blin | |
| 2008/0300027 A1 | 12/2008 | Dou et al. | |
| 2008/0305749 A1 | 12/2008 | Ben-Bassat | |
| 2009/0002077 A1 | 1/2009 | Rohani et al. | |
| 2009/0027286 A1 | 1/2009 | Ohishi | |
| 2009/0082017 A1 | 3/2009 | Chang et al. | |
| 2009/0109880 A1 | 4/2009 | Kim | |
| 2009/0121963 A1 | 5/2009 | Greene | |
| 2009/0149136 A1 | 6/2009 | Rofougaran | |
| 2009/0180403 A1 | 7/2009 | Tudosoiu | |
| 2009/0184879 A1* | 7/2009 | Derneryd et al. | 343/853 |
| 2009/0215446 A1 | 8/2009 | Hapsari et al. | |
| 2009/0231220 A1 | 9/2009 | Zhang et al. | |
| 2009/0253385 A1 | 10/2009 | Dent et al. | |
| 2009/0264065 A1 | 10/2009 | Song | |
| 2009/0278685 A1 | 11/2009 | Potyrailo | |
| 2009/0323582 A1 | 12/2009 | Proctor et al. | |
| 2010/0041348 A1 | 2/2010 | Wilcox et al. | |
| 2010/0053009 A1 | 3/2010 | Rofougaran | |
| 2010/0073103 A1 | 3/2010 | Spears | |
| 2010/0085260 A1 | 4/2010 | McKinzie | |
| 2010/0105425 A1 | 4/2010 | Asokan | |
| 2010/0232474 A1* | 9/2010 | Rofougaran et al. | 375/135 |
| 2010/0285836 A1 | 11/2010 | Horihata et al. | |
| 2010/0302106 A1 | 12/2010 | Knudsen et al. | |
| 2010/0304688 A1 | 12/2010 | Knudsen | |
| 2011/0012790 A1 | 1/2011 | Badaruzzaman et al. | |
| 2011/0014879 A1 | 1/2011 | Alberth et al. | |
| 2011/0086600 A1 | 4/2011 | Muhammad | |
| 2011/0086630 A1 | 4/2011 | Manssen | |
| 2011/0102290 A1 | 5/2011 | Milosavljevic | |
| 2011/0105023 A1* | 5/2011 | Scheer et al. | 455/41.2 |
| 2011/0121079 A1 | 5/2011 | Lawrence et al. | |
| 2011/0133994 A1 | 6/2011 | Korva | |
| 2011/0183628 A1 | 7/2011 | Baker | |
| 2011/0183633 A1 | 7/2011 | Ohba et al. | |
| 2011/0256857 A1 | 10/2011 | Chen et al. | |
| 2011/0281532 A1 | 11/2011 | Shin et al. | |
| 2011/0299438 A1 | 12/2011 | Mikhemar | |
| 2012/0075159 A1 | 3/2012 | Chang | |
| 2012/0094708 A1 | 4/2012 | Park | |
| 2012/0100802 A1 | 4/2012 | Mohebbi | |
| 2012/0214421 A1* | 8/2012 | Hoirup et al. | 455/67.11 |

(56) References Cited

U.S. PATENT DOCUMENTS

| | | | |
|---|---|---|---|
| 2012/0243579 | A1 | 9/2012 | Premakanthan et al. |
| 2012/0295554 | A1* | 11/2012 | Greene et al. ............ 455/77 |

FOREIGN PATENT DOCUMENTS

| | | |
|---|---|---|
| EP | 0685936 | 6/1995 |
| EP | 0909024 | 4/1999 |
| EP | 1079296 | 2/2001 |
| EP | 1137192 | 9/2001 |
| EP | 1298810 | 4/2006 |
| EP | 2328233 | 6/2011 |
| JP | 03276901 | 3/1990 |
| JP | 9321526 | 12/1997 |
| JP | 10209722 | 7/1998 |
| KR | 100645526 | 11/2006 |
| KR | 10-0740177 | 7/2007 |
| WO | 01/71846 | 9/2001 |
| WO | 2006/031170 | 3/2006 |
| WO | 2008/030165 | 3/2008 |
| WO | WO-2009/064968 | 5/2009 |
| WO | 2009/155966 | 12/2009 |
| WO | WO-2011/044592 | 4/2011 |
| WO | 2011/084716 | 7/2011 |
| WO | WO-2011/133657 | 10/2011 |
| WO | WO-2011028453 | 10/2011 |
| WO | 2012/085932 | 6/2012 |

OTHER PUBLICATIONS

Bezooijen, A. et al., "A GSM/EDGE/WCDMA Adaptive Series-LC Matching Network Using RF-MEMS Switches", IEEE Journal of Solid-State Circuits, vol. 43, No. 10, Oct. 2008, 2259-2268.

Huang, Libo et al., "Theoretical and experimental investigation of adaptive antenna impedance matching for multiband mobile phone applications", IEEE, Sep. 7, 2005, 13-17.

Patent Cooperation Treaty, "International Search Report and Written Opinion", Nov. 16, 2011, International Application No. PCT/US/2011/038543.

Petit, Laurent, "MEMS-Switched Parasitic-Antenna Array for Radiation Pattern Diversity", IEEE Transactions on Antennas and Propagation, vol. 54, No. 9, Sep. 2009, 2624-2631.

Zuo, S., "Eigenmode Decoupling for Mimo Loop-Antenna Based on 180 Coupler", Progress in Electromagnetics Research Letters, vol. 26, Aug. 2011, 11-20.

Hyun, S., "Effects of strain on the dielectric properties of tunable dielectric SrTiO3 thin films", Applied Physics Letters, 2004 American Institute of Physics.

Ida, I. et al., "An Adaptive Impedance Matching System and Its Application to Mobile Antennas", TENCON 2004, IEEE Region 10 Conference, See Abstract ad p. 544, Nov. 21-24, 2004, 543-547.

Patent Cooperation Treaty, "International Search Report and Written Opinion", International Application No. PCT/US2010/046241, Mar. 2, 2011.

Patent Cooperation Treaty, "International Search Report and Written Opinion", PCT Application No. PCT/US08/005085, Jul. 2, 2008.

Pervez, n. K., "High Tunability barium strontium titanate thin films for RF circuit applications", Applied Physics Letters, 2004 American Institute of Physics.

Qiao, et al., "Antenna Impedance Mismatch Measurement and Correction for Adaptive COMA Transceivers", IEEE, 2005.

Qiao, et al., "Measurement of Antenna Load Impedance for Power Amplifiers", The Department of Electrical and Computer Engineering, University of California, San Diego, Sep. 13, 2004.

Stemmer, Susanne, "Low-loss tunable capacitors fabricated directly on gold bottom electrodes", University of California Postprints 2006.

Taylor, T.R., "Impact of thermal strain on the dielectric constant of sputtered barium strontium titanate thin films", Applied Physics Letters, 2002 American Institute of Physics.

Tombak, Ali, Tunable Barium Strontium Titanate Thin Film Capacitors for RF and Microwave Applications. IEEE Microwave and Wireles Components Letters, vol. 12, Jan. 2002.

Xu, Hongtao, "Tunable Microwave Integrated Circuits using BST Thin Film Capacitors with Device", Integrated Ferroelectrics, Department of Electrical Engineering and Computer Engineering, University of California, 2005.

Du Toit, "Tunable Microwave Devices With Auto Adjusting Matching Circuit", U.S. Appl. No. 13/302,617, filed Nov. 22, 2011.

Du Toit, "Tunable Microwave Devices With Auto-Adjusting Matching Circuit", U.S. Appl. No. 13/302,649, filed Nov. 22, 2011.

"Method and Apparatus for Tuning a Communication Device", U.S. Appl. No. 13/108,463, filed May 16, 2011.

Greene, , "Method and Apparatus for Tuning a Communication Device", U.S. Appl. No. 13/108,589, filed May 16, 2011.

Hoirup, , "Method and Apparatus for Radio Antenna Frequency Tuning", U.S. Appl. No. 13/030,177, filed Feb. 18, 2011.

Manssen, "Method and Apparatus for Managing Interference in a Communication Device", U.S. Appl. No. 61/326,206; filed Apr. 20, 2010.

Manssen, "Method and Apparatus for Tuning Antennas in a Communication Device", U.S. Appl. No. 12/941,972, filed Nov. 8, 2010.

Manssen, "Method and Apparatus for Tuning Antennas in a Communication Device", U.S. Appl. No. 13/005,122, filed Jan. 12, 2011.

McKinzie, "Adaptive Impedance Matching Module (AIMM) Control Architectures", U.S. Appl. No. 13/293,544, filed Nov. 8, 2010.

McKinzie, "Adaptive Impedance Matching Module (AIMM) Control Architectures", U.S. Appl. No. 13/293,550, filed Nov. 10, 2011.

McKinzie, "Method and Apparatus for Adaptive Impedance Matching", U.S. Appl. No. 13/217,748, filed Aug. 25, 2011.

Mendolia, , "Method and Apparatus for Tuning a Communcation Device", U.S. Appl. No. 13/035,417, filed Feb. 25, 2011.

Paratek Microwave, Inc., , "Method and Appartus for Tuning Antennas in a Communication Device", International Application No. PCT/US11/59620; Filed Nov. 7, 2011.

Spears, , "Method for Tuning an Adaptive Impedance Matching Network with a Look-Up Table", U.S. Appl. No. 13/297,951, filed Nov. 16, 2011.

* cited by examiner

800

1000

1100

1200

1300

1600

LOOK-UP TABLE

| |
|---|
| Band 1; Use Case 1; Desired tuning state |
| Band 1; Use Case 2; Desired tuning state |
| ⋮ |
| Band 1; Use Case n; Desired tuning state |
| Band 2; Use Case 1; Desired tuning state |
| Band 2; Use Case 2; Desired tuning state |
| ⋮ |
| Band 2; Use Case n; Desired tuning state |
| Band N; Use Case 1; Desired tuning state |
| Band N; Use Case 2; Desired tuning state |
| ⋮ |
| Band N; Use Case n; Desired tuning state |

METHOD AND APPARATUS FOR TUNING A COMMUNICATION DEVICE

CROSS-REFERENCE TO RELATED APPLICATIONS

The present application is related to U.S. application Ser. No. 13/108,589 filed May 16, 2011, and which is titled "Method and Apparatus For Tuning A Communication Device", the disclosure of which is hereby incorporated by reference.

FIELD OF THE DISCLOSURE

The present disclosure relates generally to communication systems, and more specifically to a method and apparatus for tuning a communication device.

BACKGROUND

Existing multi-frequency wireless devices (e.g., radios) use an antenna structure that attempts to radiate at optimum efficiency over the entire frequency range of operation, but can really only do so over a subset of the frequencies. Due to size constraints, and aesthetic design reasons, the antenna designer is forced to compromise the performance in some of the frequency bands. An example of such a wireless device could be a mobile telephone that operates over a range of different frequencies, such as 800 MHz to 2200 MHz. The antenna will not radiate efficiently at all frequencies due to the nature of the design, and the power transfer between the antenna, the power amplifier, and the receiver in the radio will vary significantly.

Additionally, an antenna's performance is impacted by its operating environment. For example, multiple use cases exist for radio handsets, which include such conditions as the placement of the handset's antenna next to a user's head, or in the user's pocket or the covering of an antenna with a hand, can significantly impair wireless device efficiency. Further, many existing radios use a simple circuit composed of fixed value components that are aimed at improving the power transfer from power amplifier to antenna, or from the antenna to the receiver, but since the components used are fixed in value there is always a compromise when attempting to cover multiple frequency bands and multiple use cases.

BRIEF DESCRIPTION OF THE DRAWINGS

FIG. 18 depicts an illustrative embodiment of a look-up table utilized by one or more of the devices of FIGS. 1-6 and the method of FIG. 17.

DETAILED DESCRIPTION

Figure 1:
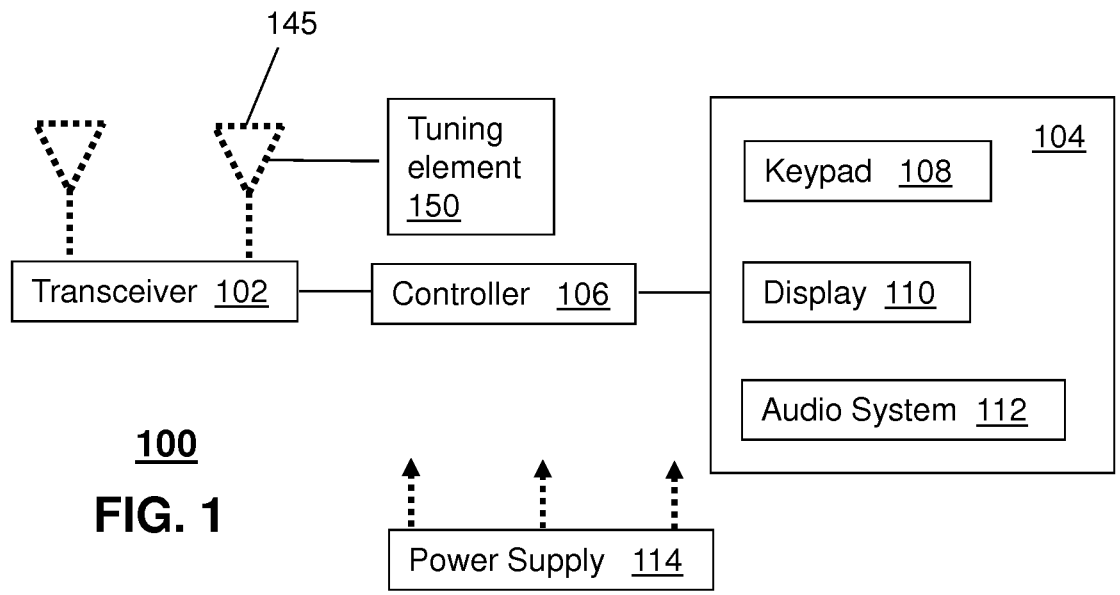
FIG. 1 depicts an illustrative embodiment of a communication device.

One or more of the exemplary embodiments described herein can have an antenna with a tunable element attached to the radiating elements of the antenna. The tunable element can be of various types, such as a Passive Tunable Integrated Circuit (PTIC) having one or more electrically tunable capacitors.

In one embodiment, the antenna can be directly tuned over frequency, moving the resonant frequency of the radiating element. By doing so, the magnitude of the VSWR that the antenna presents to the transceiver, can be adjusted, and can be kept within a range that is easier to match to the transceiver.

In another embodiment, on-antenna tuning can be combined with a tunable matching network such as positioned at a feed point of the antenna to achieve greater gains in total antenna efficiency as compared with utilizing either of these tuning methods separately.

In one embodiment, the tunable element on the antenna can be tuned using an open loop methodology, such as tuning it strictly as a function of the band/frequency that the transceiver is operating in. In another embodiment, other criteria can also be used in combination with, or in place of, the band/frequency information, including mechanical configuration (slide up/down) or other use cases, and other inputs, such as proximity detector status and accelerometer position information. The use cases can vary and can include speaker phone operation, flip open and so forth.

In another embodiment, the tunable element on the antenna can be tuned to place the RF voltage present at a measuring component in proximity to the antenna, such as a detector, within a preset range. The range can be determined based on knowledge of the power being transmitted by the handset's transceiver, and can be used to establish the input impedance of the antenna within a range of Voltage Standing Wave Ratio (VSWR) that would allow a tunable matching network, such as coupled at a feed point of the antenna, to improve the impedance match between the antenna and the transceiver. This embodiment can incorporate two separate "loops" of a closed loop algorithm, allowing the tunable element of the antenna to be tuned in a closed loop algorithm utilizing feedback from a detector, and once that loop settled, then the tunable matching network can be tuned using information from a directional coupler and the detector.

Another embodiment can utilize information from a detector and a directional coupler in a combined closed loop algorithm. The algorithm can simultaneously adjust the tunable element(s) on the antenna and the tunable matching network while also increasing the RF voltage detected at the detector subject to the constraints on return loss and other figure of merit parameters determined by the directional coupler inputs. One or more of such algorithms are described in U.S. application Ser. No. 11/940,309 to Greene, the disclosure of which is hereby incorporated by reference.

Another embodiment can utilize information obtained from a detector and/or a directional coupler using one or more of the methodologies described in U.S. application Ser. No. 13/005,122 to Greene, the disclosure of which is hereby incorporated by reference. The methodologies can include using the derivatives or slopes of the RF voltages at the detectors responsive to changes in the control signals to the tunable elements.

In yet another embodiment, detuning of a first antenna among a plurality of antennas can be performed in order to reduce coupling of the first antenna with one or more other antennas. The detuning of the first antenna can improve the performance of the one or more other antennas.

One embodiment of the present disclosure entails a tuning system for a communication device having an antenna, the tuning system includes at least one first tunable element connected with at least one radiating element of the antenna for tuning the antenna where the adjusting of the at least one first tunable element is based on at least one of a use case associated with the communication device and location information associated with the communication device, and a matching network having at least one second tunable element coupled at a feed point of the antenna, wherein the matching network receives control signals for adjusting the at least one second tunable element to tune the matching network.

One embodiment of the present disclosure entails a method including tuning an antenna of a communication device by adjusting at least one first tunable element of the communication device that is connected with at least one radiating element of the antenna where the adjusting of the at least one first tunable element is based on a use case associated with the communication device, and tuning a matching network of the communication device by adjusting at least one second tunable element of the matching network that is coupled between the antenna and a transceiver of the communication device, wherein the adjusting of the second tunable element is a closed loop process based on an operational parameter of the communication device.

One embodiment of the present disclosure entails a tuning system that includes a memory and a controller. The controller is programmed to receive antenna efficiency information associated with one or more antennas of a group of antennas of a communication device, receive antenna isolation information associated with one or more antennas of the group of antennas, and tune at least a portion of the group of antennas based on the antenna efficiency information and the antenna isolation information.

The exemplary embodiments can employ open loop tuning processes, such as at the on-antenna tunable element and/or at the matching network. The use cases can include a number of different states associated with the communication device, such as flip-open, flip-closed, slider-in, slider-out (e.g., Qwerty or numeric Keypad), speaker-phone on, speaker-phone off, hands-free operation, antenna up, antenna down, other communication modes on or off (e.g., Bluetooth/WiFi/GPS), particular frequency band, and/or transmit or receive mode. The use case can be based on object or surface proximity detection (e.g., a user's hand or a table). Other environmental effects can be included in the open loop process, such as temperature, pressure, velocity and/or altitude effects. The open loop process can take into account other information, such as associated with a particular location (e.g., in a building or in a city surrounded by buildings), as well as an indication of being out of range.

The exemplary embodiments can utilize combinations of open loop and closed loop processes, such as tuning a tunable element based on both a use case and a measured operating parameter (e.g., measured by a detector in proximity to the antenna and/or measured by a directional coupler between the matching network and the transceiver). In other examples, the tuning can utilize one process and then switch to another process, such as using closed loop tuning and then switching to open loop tuning based on particular factors associated with the communication device.

FIG. 1 depicts an exemplary embodiment of a communication device 100. The communication device 100 can comprise a wireless transceiver 102 (herein having independent transmit and receive sections and having one or more antennas 145 (two of which are shown in this example)), a user interface (UI) 104, a power supply 114, and a controller 106 for managing operations thereof. The wireless transceiver 102 can utilize short-range or long-range wireless access technologies such as Bluetooth, WiFi, Digital Enhanced Cordless Telecommunications (DECT), or cellular communication technologies, just to mention a few. Cellular technologies can include, for example, CDMA-1x, WCDMA, UMTS/HSDPA, GSM/GPRS, TDMA/EDGE, EV/DO, WiMAX, and next generation cellular wireless communication technologies as they arise.

The UI 104 can include a depressible or touch-sensitive keypad 108 with a navigation mechanism such as a roller ball, joystick, mouse, or navigation disk for manipulating operations of the communication device 100. The keypad 108 can be an integral part of a housing assembly of the communication device 100 or an independent device operably coupled thereto by a tethered wireline interface (such as a flex cable) or a wireless interface supporting for example Bluetooth. The keypad 108 can represent a numeric dialing keypad commonly used by phones, and/or a Qwerty keypad with alphanumeric keys. The UI 104 can further include a display 110 such as monochrome or color LCD (Liquid Crystal Display), OLED (Organic Light Emitting Diode) or other suitable display technology for conveying images to an end user of the communication device 100. In an embodiment where the display 110 is a touch-sensitive display, a portion or all of the keypad 108 can be presented by way of the display.

The power supply 114 can utilize common power management technologies (such as replaceable batteries, supply regulation technologies, and charging system technologies) for supplying energy to the components of the communication device 100 to facilitate portable applications. The controller 106 can utilize computing technologies such as a microprocessor and/or digital signal processor (DSP) with associated storage memory such a Flash, ROM, RAM, SRAM, DRAM or other like technologies.

The communication device 100 can utilize an on-antenna tuning element 150, which can be directly connected with the radiating element(s), including high band (HB) and low band (LB) radiating elements and/or a portion of the radiating elements. Tuning elements can be a number of components in a number of different configurations, including variable capacitors such as electrically tunable capacitors, although other tunable elements are also contemplated by the present disclosure including a semiconductor varactor, a micro-electro-mechanical systems (MEMS) varactor, a MEMS switched reactive element, a piezoelectric component or a semiconductor switched reactive element.

Figure 2:
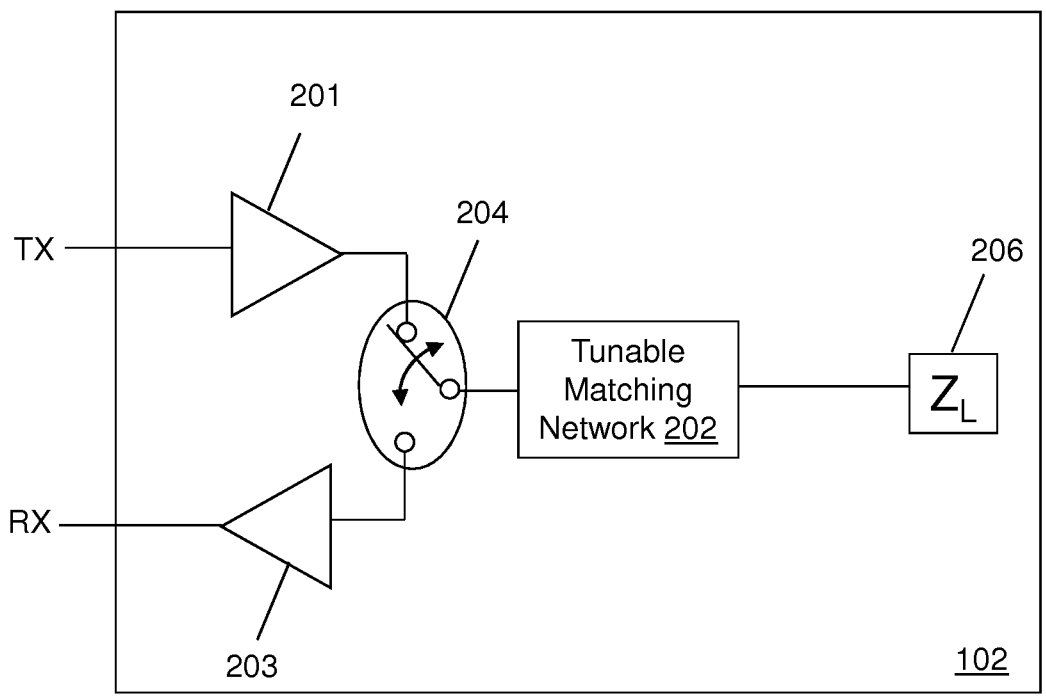
FIG. 2 depicts an illustrative embodiment of a portion of a transceiver of the communication device of FIG. 1.

FIG. 2 depicts an illustrative embodiment of a portion of the wireless transceiver 102 of the communication device 100 of FIG. 1. In GSM applications, the transmit and receive portions of the transceiver 102 can include common amplifiers 201, 203 coupled to a tunable matching network 202 and an impedance load 206 by way of a switch 204. The load 206 in the present illustration can be an antenna as shown in FIG. 1 (herein antenna 206). A transmit signal in the form of a radio frequency (RF) signal (TX) can be directed to the amplifier 201 which amplifies the signal and directs the amplified signal to the antenna 206 by way of the tunable matching network 202 when switch 204 is enabled for a transmission session. The receive portion of the transceiver 102 can utilize a pre-amplifier 203 which amplifies signals received from the antenna 206 by way of the tunable matching network 202 when switch 204 is enabled for a receive session. Other configurations of FIG. 2 are possible for other types of cellular access technologies such as CDMA. These undisclosed configurations are contemplated by the present disclosure.

Figure 3:
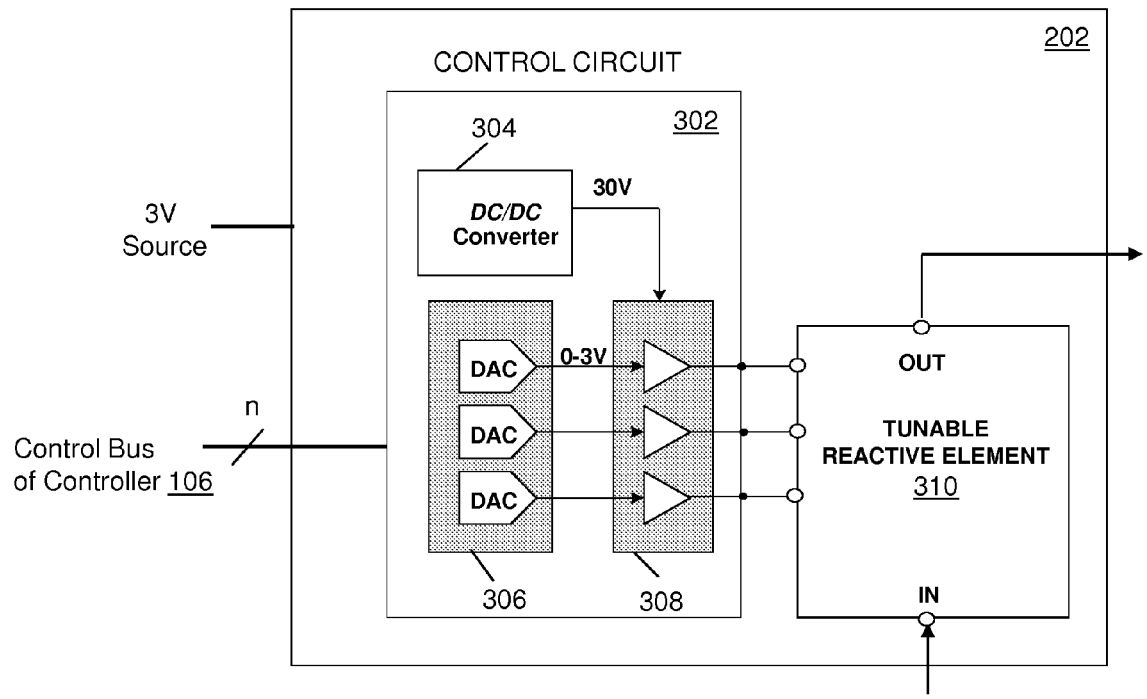
FIGS. 3-4 depict illustrative embodiments of a tunable matching network of the transceiver of FIG. 2.
Figure 4:
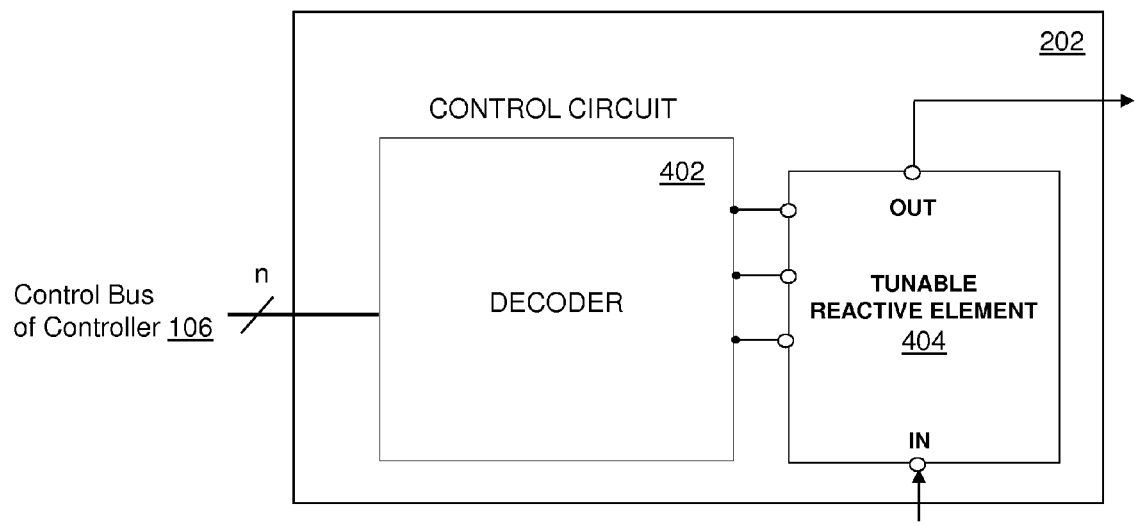
Figure 5:
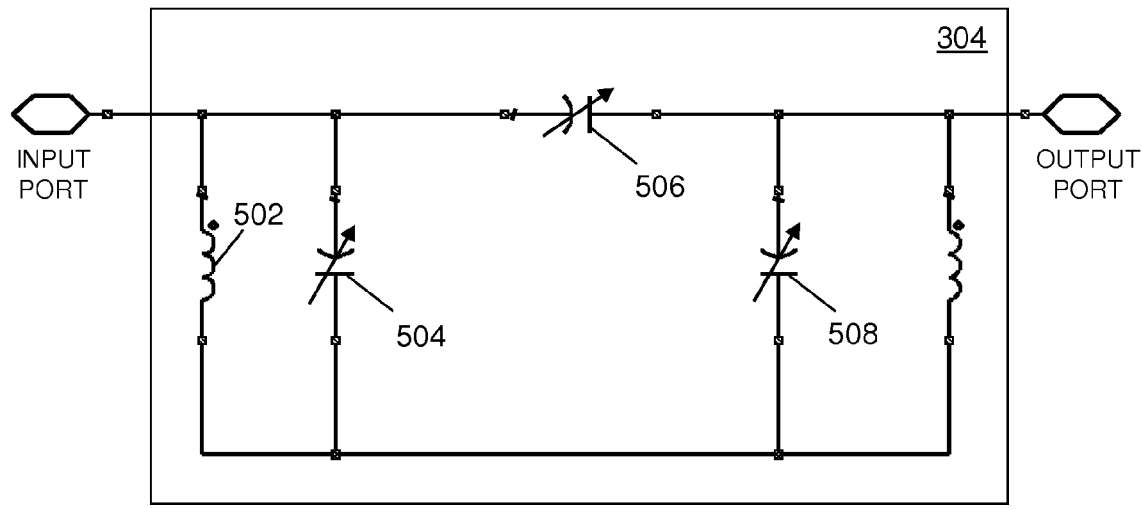
FIGS. 5-6 depict illustrative embodiments of a tunable reactive element of the tunable matching network.

FIGS. 3-4 depict illustrative embodiments of the tunable matching network 202 of the transceiver 102 of FIG. 2. In one embodiment, the tunable matching network 202 can comprise a control circuit 302 and a tunable reactive element 310. The control circuit 302 can comprise a DC-to-DC converter 304, one or more digital to analog converters (DACs) 306 and one or more corresponding buffers 308 to amplify the voltage generated by each DAC. The amplified signal can be fed to one or more tunable reactive components 504, 506 and 508 such as shown in FIG. 5, which depicts a possible circuit configuration for the tunable reactive element 310. In this illustration, the tunable reactive element 310 includes three tunable capacitors 504-508 and an inductor 502 with a fixed inductance. Other circuit configurations are possible, and thereby contemplated by the present disclosure.

The tunable capacitors 504-508 can each utilize technology that enables tunability of the capacitance of said component. One embodiment of the tunable capacitors 504-508 can utilize voltage or current tunable dielectric materials such as a composition of barium strontium titanate (BST). An illustration of a BST composition is the Parascan® Tunable Capacitor. In another embodiment, the tunable reactive element 310 can utilize semiconductor varactors. Other present or next generation methods or material compositions that can support a means for a voltage or current tunable reactive element are contemplated by the present disclosure.

The DC-to-DC converter 304 can receive a power signal such as 3 Volts from the power supply 114 of the communication device 100 in FIG. 1. The DC-to-DC converter 304 can use common technology to amplify this power signal to a higher range (e.g., 30 Volts) such as shown. The controller 106 can supply digital signals to each of the DACs 306 by way of a control bus of "n" or more wires to individually control the capacitance of tunable capacitors 504-508, thereby varying the collective reactance of the tunable matching network 202. The control bus can be implemented with a two-wire common serial communications technology such as a Serial Peripheral Interface (SPI) bus. With an SPI bus, the controller 106 can submit serialized digital signals to configure each DAC in FIG. 3 or the switches of the tunable reactive element 404 of FIG. 4. The control circuit 302 of FIG. 3 can utilize common digital logic to implement the SPI bus and to direct digital signals supplied by the controller 106 to the DACs.

Figure 6:
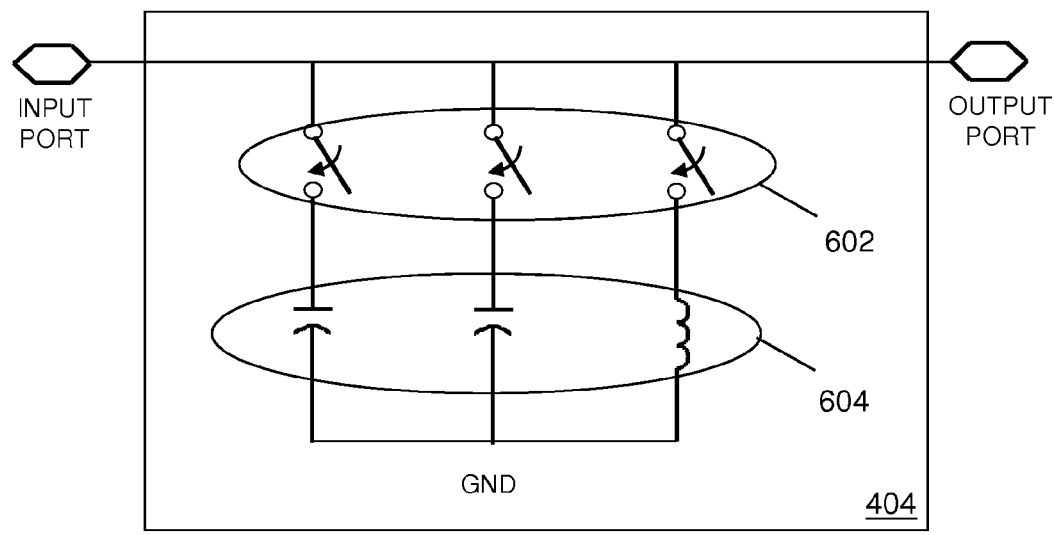

In another embodiment, the tunable matching network 202 can comprise a control circuit 402 in the form of a decoder and a tunable reactive element 404 comprising switchable reactive elements such as shown in FIG. 6. In this embodiment, the controller 106 can supply the control circuit 402 signals via the SPI bus which can be decoded with common Boolean or state machine logic to individually enable or disable the switching elements 602. The switching elements 602 can be implemented with semiconductor switches or micro-machined switches, such as utilized in micro-electromechanical systems (MEMS). By independently enabling and disabling the reactive elements (capacitor or inductor) of FIG. 6 with the switching elements 602, the collective reactance of the tunable reactive element 404 can be varied.

The tunability of the tunable matching networks 202, 204 provides the controller 106 a means to optimize performance parameters of the transceiver 102 such as, for example, but not limited to, transmitter power, transmitter efficiency, receiver sensitivity, power consumption of the communication device, a specific absorption rate (SAR) of energy by a human body, frequency band performance parameters, and so on.

Figure 7:
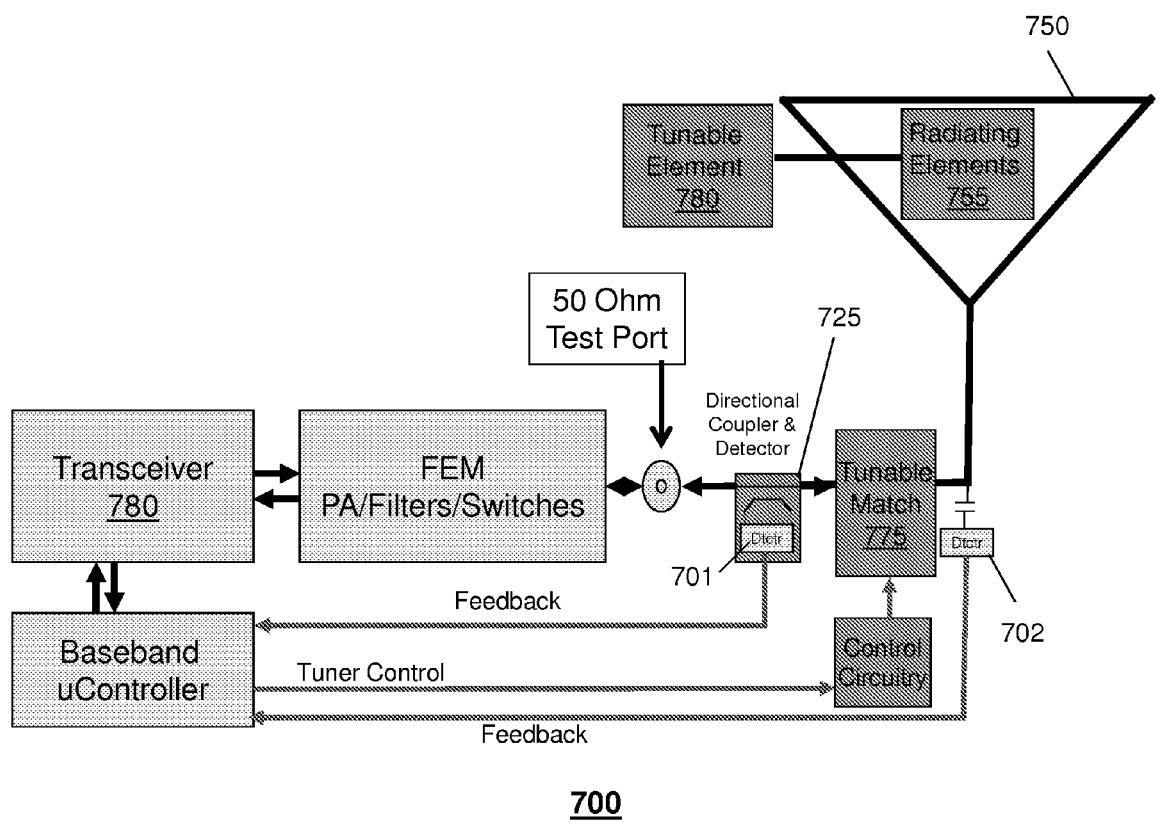
FIG. 7 depicts an illustrative embodiment of a portion of a communication device.

FIG. 7 depicts an exemplary embodiment of a portion of a communication device 700 (such as device 100 in FIG. 1) having a tunable matching network which can include, or otherwise be coupled with, a number of components such as a directional coupler, RF detectors, control circuitry and/or a tuner. The tunable matching network can include various other components in addition to, or in place of, the components shown, including components described above with respect to FIGS. 1-6. In addition to the detector 701 coupled to the directional coupler 725, there is shown a detector 702 coupled to the RF line feeding the antenna 750. A tunable matching network 775 can be coupled to the antenna 750 and a transceiver 780 (or transmitter and/or receiver) for facilitating communication of signals between the communication device 700 and another device or system. In this exemplary embodiment, the tunable match can be adjusted using all or a portion of the detectors for feedback to the tuning algorithm.

Various algorithms can be utilized for adjusting the matching network 750, some of which are disclosed in U.S. Patent Application Publication No. 2009/0121963 filed on Nov. 14, 2007 by Greene, the disclosure of which is hereby incorporated by reference herein. The Greene application describes several methods utilizing Figures of Merit, which in this exemplary embodiment can be determined in whole or in part from measurements of the forward and reverse signals present at detector 701. This exemplary embodiment can also utilize detector 702 to further improve the ability of the tuning system to enable improved performance of the communication device. One embodiment of the algorithm can utilize the inputs from detector 701 to establish a maximum return loss or VSWR for the matching network. This method can establish a range of impedances around the targeted impedance. This range of impedances may establish an acceptable level of performance. Input from detector 702 can then be utilized to allow the algorithm to find an improved or best impedance within that acceptable range. For instance, the algorithm could continue to modify the matching network 775 in order to increase the RF voltage detected at the antenna feed, while constraining the return loss (measured by detector 701) to stay within the target return loss. In this embodiment, communication device 700 can allow tuning for source impedances that are not 50 ohms. Additionally detector 702 allows the algorithm to minimize the insertion loss of the tunable match 775.

In another embodiment, the tuning algorithm can maintain the return loss while minimizing the current drain to determine desired tuning values. The tuning algorithm can utilize various parameters for tuning the device, including output power of the transmitter, return loss, received power, current drain and/or transmitter linearity.

Communication device 700 can include one or more radiating elements 755 of the antenna 750. One or more tunable elements 780 can be connected directly with one or more of the radiating elements 755 to allow for tuning of the antenna 750 in conjunction with tuning of the matching network 775. The tunable elements 780 can be of various types as described herein, including electrically tunable capacitors. The number and configuration of the tunable elements 780 can be varied based on a number of factors, including whether the tuning is an open loop or a closed loop process. In one embodiment, all of the radiating elements 755 have at least one tunable element 780 connected thereto to allow for tuning of the radiating element. In another embodiment, only a portion of the radiating elements 755 have a tunable element 780 connected thereto.

Figure 8:
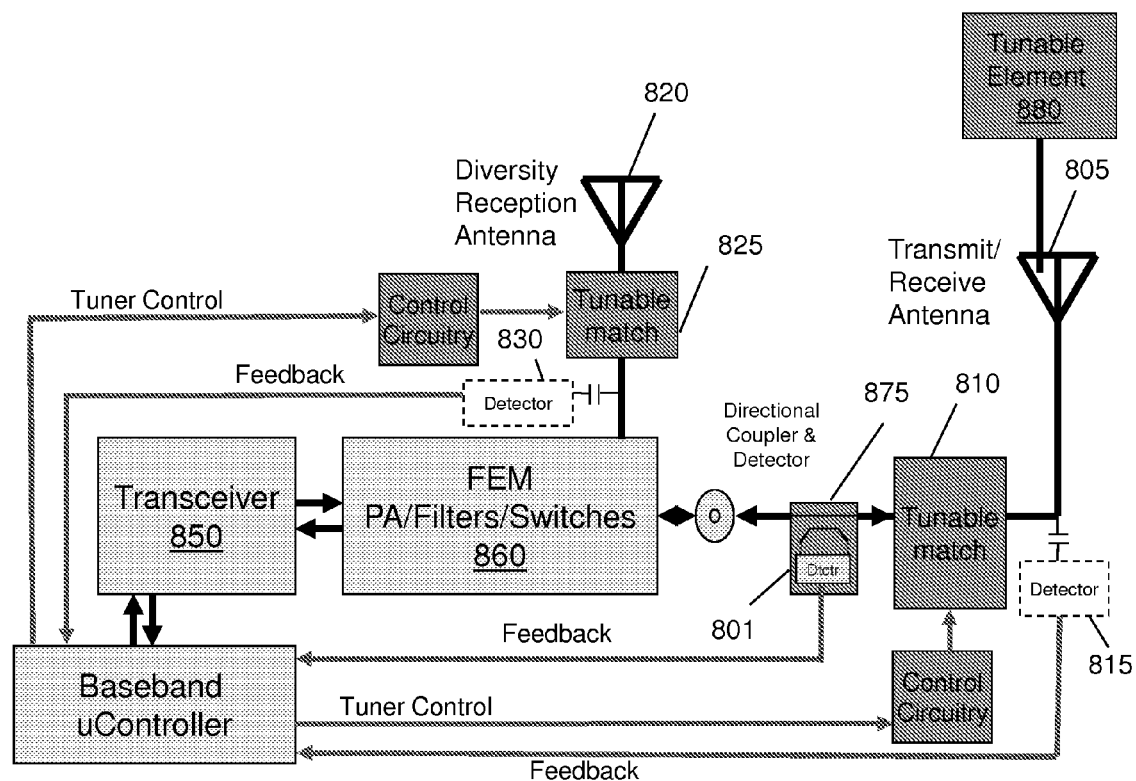
FIG. 8 depicts an illustrative embodiment of a portion of a multiple antenna communication device.

In another exemplary embodiment, FIG. 8 depicts a portion of a communication device 800 (such as device 100 in FIG. 1) having tunable matching networks for use with a multiple antenna system. In this exemplary embodiment, there are two antennas, which are a transmit/receive antenna 805 and a diversity reception antenna 820. However, it should be understood that other numbers, types and/or configurations of antennas can be utilized with device 800. For instance, the antennas can be spatially diverse, pattern diverse, polarization diverse and/or adaptive array antennas. Tunable elements 880 can be connected with radiating elements or a portion thereof of the antenna 805. In another embodiment, tunable elements 880 can be connected with multiple antennas (not shown). Tunable elements 880 allow for tuning and/or detuning of one or more of the antennas, including in combination with the tuning of the matching networks 810 and/or 825.

In one embodiment, the antennas of communication device 800 can be part of a MIMO (multiple-input and multiple output) system. The multiple antennas can be utilized for improving communications, such as through switching or selecting techniques, including analyzing noise in the multiple signals and selecting the most appropriate signal. The multiple antennas can also be used with combining techniques where the signals can be added together, such as equal gain combining or maximal-ratio combining. Other techniques for utilizing multiple signals from multiple antennas are also contemplated by the exemplary embodiments, including dynamic systems that can adjust the particular techniques being utilized, such as selectively applying a switching technique and a combination technique. The particular position(s) of the antenna(s) can vary and can be selected based on a number of factors, including being in close enough proximity to couple RF energy with each other.

Communication device 800 can include a number of other components such as tunable matching networks which can include or otherwise be coupled with a number of components such as directional couplers, sensor ICs, bias control and other control ICs and tunable matching networks. The tunable matching networks can include various other components in addition to, or in place of the components shown, including components described above with respect to FIGS. 1-7. This example also includes a transceiver 850 of the communication device 800 that includes multiple receivers and/or transmitters for the multiple antennas 805 and 820 to serve the purpose of diversity reception.

In one embodiment, a first tunable matching network 810 can be coupled at the input to the transmit/receive antenna 805 and a second tunable matching network 825 can be coupled to the input to the diversity reception antenna 820. Both of these matching networks 810 and 825 can be adjusted (e.g., tuned) to improve performance of the communication device 800 in response to changes in bands, frequencies of operation, physical use cases and/or proximity of the antennas 805 and 820 to the user or other objects which can affect the impedances presented by the antennas to the Front End Module (FEM) 860 and transceiver 850. In one embodiment, the feedback line could be removed, such as by using the FEM to route these signals appropriately to perform these measurements (e.g., avoiding filtering out the signals).

Tunable matching network 810 can be adjusted using different methods and/or components, some of which were disclosed in U.S. Patent Application Publication No. 2009/0121963. In one embodiment, a detector 830 can be coupled to the device 800 so as to detect RF voltage present at the connection to the diversity reception antenna 820. Received power levels at this point may be below −50 dBm. Some detectors, such as a diode detector or a logarithmic amplifier, may not typically be adequate to detect such levels. However, since in this exemplary embodiment, the two antennas 805 and 820 are in the same device 800 and in proximity to each other, they can inherently couple RF energy from one antenna to the other. While the communication device 800 does not require this coupling, its presence can be utilized by the exemplary embodiments for the purposes of tuning the antenna matching networks. In one example, after establishing the tuning state for the diversity match at the transmit frequency, a predetermined relationship or offset can be applied to the matching network 825 in order to adjust the match to the receiver operating frequency.

In one embodiment, the tunable match on the transmit/receive antenna 805 can be tuned similar to the technique described above with respect to FIG. 7 but instead of using detector 815, detector 830 can be used to measure increases in transmitted RF power coupled to the diversity reception antenna 820. As such, detector 815 (shown in broken lines in FIG. 8) can be removed from the device 800, thereby reducing the cost and complexity. Thus, this example would tune both antennas utilizing only one detector (e.g., detector 830) coupled with one of the antennas (e.g., the diversity reception antenna 820) and without another detector coupled to the other antenna. This example relies upon a fairly constant coupling coefficient between the two antennas at any particular band, frequency and use case, and for any operation of the algorithm these may all be considered constant.

In another embodiment, after tunable matching network 810 is adjusted by the algorithm, tunable matching network 825 can also be adjusted. By measuring the coupled transmitted power present at detector 830, the tunable matching network 825 can be adjusted to increase coupled transmitter power seen at detector 830. In one example, after establishing the tuning state for the diversity match at the transmit frequency, a predetermined relationship or offset can be applied to the matching network 825 in order to adjust the match to the receiver operating frequency. For instance, the tuning circuits can be adjusted initially based on transmitter oriented metrics and then a predetermined relationship or offset can be applied to attain a desired tuning state for both transmitter and receiver operation. In another embodiment, the operational metric can be one or more of transmitter reflection loss, output power of the transmitter, current drain and/or transmitter linearity.

For example, in a time division multiplexed (TDM) system in which the transmitter and the receiver operate at different frequencies but only operate in their respective time slots (i.e., transmit time slot and receive time slot), this can be accomplished by identifying an optimal tuning for the transmitter and then adding an empirically derived adjustment to the tuning circuits in receive mode. As another example, in a frequency division multiplexed (FDM) system in which the transmitter and receiver operate simultaneously and at different frequencies, this can be accomplished by identifying a target operation for the transmitter, and then adjusting the tuning circuits first to the target value for the transmitter and then adjusting the values to approach a compromised value proximate to an equal or desired target value for the receiver. In one embodiment, a predetermined relationship, (e.g., an offset, scaling factor, translation or other change or modification) can be applied to the adjustments of the variable components when switching from the transmit mode to the receive mode. This translation can be a function of the values obtained while adjusting during the transmit time slot. The translation can then be removed upon return to the transmitter mode and the adjustment process is resumed. In one embodiment, because any frequency offset between the transmit signal and the receive signal is known, an adjustment or modification of the setting of the matching network in the form of a translation or some other function can be applied to the matching network during the receive time slot. In another embodiment, the adjustment can be performed in multiple steps if the transmission and reception frequencies are far apart.

In another embodiment, a Figure of Merit can be utilized that not only incorporates the transmit metrics, but also incorporates an element to attain a compromise between optimal transmitter and optimal receiver operation. This can be accomplished by identifying a target operation goal, such as a desired transmitter and receiver reflection loss and then identifying an operational setting that is a close compromise between the two. This embodiment thus can incorporate not only transmitter metrics but also tuning circuit settings or preferences into the algorithm. The tuning preferences can be empirically identified to ensure the desired operation.

In one embodiment where the communication device 800 employs antenna diversity for receive operation but does not employ antenna diversity for transmit operation, antenna 820 would be receive only. The transceiver can transmit on antenna 805 and can receive on both antennas 805 and 820. For adaptive closed loop tuning of the tunable matching network 825 on the diversity antenna, the communication device 800 can obtain a metric indicating the performance of the tunable matching circuit at the receive frequency. The metric can be used to tune the match to adjust the performance at the receive frequency. This can be done by measuring the level of the received signal using the receiver in the transceiver IC. This measurement is known as RSSI, received signal strength indicator. An RSSI measurement can be very noisy and unstable due to highly variable impairments in the propagation channel, such as fading. These variations can be filtered using averaging. However, the amount of averaging necessary could make such a measurement prohibitively slow and not suitable as feedback for closed loop antenna tuning.

In this embodiment, the transmit signal is moderately coupled to the tunable match in the diversity path because the main antenna and the diversity antenna are located on the same communications device. The main antenna and the diversity antenna may only have 20 dB isolation in many cases. The transmit signal present at tunable match 825 may be a much stronger and more stable signal than the receive signal present at tunable matching network 825. The transmit signal can be used to make reliable measurements that can be used for closed loop tuning.

The transmit signal can be measured using detector 830. The detector can be placed between the tunable match and the transceiver. This is effectively the output of the tunable match. A directional coupler is not necessary for this measurement in this embodiment, and capacitive or resistive coupling may be used, as long as the detector has sufficient dynamic range. Other components and configurations of the components can also be utilized for the parameter detection, such as shown in U.S. Patent Publication No. 20090039976 by McKinzie, the disclosure of which is hereby incorporated by reference.

In this embodiment, maximizing the output voltage of a tunable match can be the equivalent to minimizing insertion loss, and for a lossless network it can be equivalent to minimizing mismatch loss. An alternative to using detector 830 is to use the receiver itself (tuned to the transmit frequency) to measure the transmit signal. These are a few viable methods for measuring the transmit signal through the diversity tunable match. Other forms of signal detection are contemplated by the present disclosure.

A complication with using the transmit signal for tuning can be that it is at a different frequency than the receive signal and the objective of the tunable match in the diversity path is to adjust performance at the receive frequency. In one exemplary method, the tunable matching circuit is adjusted for reception performance based on transmission measurements. In this exemplary method, a tunable match can be optimized at the transmit frequency using measurements on the transmit signal and then the matching circuit can be adjusted using a predetermined relationship between the transmit settings and the receive settings to provide the desired performance at the receive frequency.

In one embodiment that utilizes a tunable matching network which contains two tunable capacitors, one set of tuning values, designated (C1TX, C2TX), can be applied only during the measurement of the transmit signal. The other set of tuning values, designated (C1RX, C2RX), can be applied in between the transmit slots, or just during the receive time slots allowing for alternate tuning during a slot which may be used to monitor other base stations or other networks. This embodiment describes two tunable capacitors, but this exemplary embodiment can apply to various numbers and types of tunable elements. In this embodiment, the Rx tuning values are a function of the Tx tuning values. As the Tx values adaptively change throughout the iterative algorithm, the Rx values will also change, tracking the Tx values with a predetermined relationship. If the figure of merit is set to maximize Vout, the Tx solution can converge at (C1TXopt, C2TXopt), and can be appropriately adjusted using the predetermined relationship to (C1RXopt, C2RXopt) to achieve the desired RX performance.

Each time the tunable match is set to (C1TX, C2TX) in order to perform a Tx measurement, the performance at the Rx frequency may be degraded during the time that (C1TX, C2TX) is applied. It is desirable in this embodiment to perform the measurement as quickly as possible to minimize the Rx degradation caused by Tx tuning during the measurement. In one embodiment, the Tx values can be applied for less than one percent of the time while still achieving adequate convergence time.

In one embodiment, the relationship between the TX and RX tuning solutions can be dependent upon the bands of operation, and in the case where the receiver is tuned to monitor signals in an alternate band, then an alternate tuning solution (C1RX2, C2RX2) can be applied during that measurement.

Another exemplary method for controlling the tuning can be employed, which does not require setting the tunable capacitors to values optimized for transmission while performing the Tx measurement. The objective is to operate the tuning matching network at settings that optimize Rx performance. These settings are at capacitance values that are a specific amount away from the Tx optimum in a specific direction. An algorithm can be utilized that will find this location in the capacitance plane without first needing to find the Tx optimum. The Tx level can change based on a number of circumstances, such as from power control commands in the transceiver or from variations in supply voltage, temperature, component tolerances, and so forth. In this embodiment, since only measurement of the output RF voltage of the tuner is being performed, a determination may not be made as to whether the algorithm is at the Tx optimum or a specific amount away from the Tx optimum because the Tx level is changing. This may prevent the use of an algorithm that simply targets a specific Tx signal level.

A metric that can be useful in determining where the tuning matching network is operating relative to the Tx optimum is to utilize the slope, or derivative of the Tx level with respect to the value or setting of the tunable capacitors (or other types of tunable elements). If the RF voltage (Vout) present at the output of the tunable match at the TX frequency is determined, such as through use of a log detector, then the first derivatives are dVout/dC1 and dVout/dC2. These derivatives can be calculated using the finite difference of two sequential measurements. These slopes will be a function of the tunable capacitors. These slopes will not be a function of the absolute power level of the Tx signal since a log detector is being utilized. If a log detector or its equivalent is not utilized, the logarithm of the Tx voltage can be calculated prior to calculating the slope. By defining a Figure of Merit that includes dVout/dC1 and dVout/dC2, the algorithm can converge to a solution that is a specific amount away from the Tx optimum in a specific direction, in this case near the Rx optimum. In this embodiment, a log detector is a device having a logarithmic response.

In some cases, specifying the slopes alone will not result in a unique solution (i.e., there may be multiple solutions). The algorithm can resolve this situation by adding a PTC preference to the Figure of Merit. A tunable match may have many solutions that meet a Tx RL goal and a PTC preference can be included in the Figure of Merit to identify a solution that not only meets the Tx RL goal but also meets an Rx performance goal. Similarly, a tunable match may have many solutions that meet a slope criteria and a PTC preference can be included in the Figure of Merit to identify a solution that not only meets the slope criteria but also meets an Rx performance goal.

In cases where using dVout alone results in multiple solutions, it is also possible to use the second derivative to resolve these cases. For example, second derivatives ($d^2$Vout/dC2dC1) can be utilized, which is dVout/dC2 differentiated with respect to C1. Specifying dVout/dC2 and $d^2$Vout/dC2dC1 can identify the correct or desired Rx solution from the multiple solutions. This exemplary method can include determining derivative information (e.g., one or more of a first derivative, and/or a second derivative, and/or etc.) associated with the RF voltage based on derivatives of the RF voltage and the variable capacitance values, and tuning the tunable matching network using the derivative information.

Another exemplary embodiment can use detector 830 of the communication device 800 in the diversity path as feedback to adjust tunable matching network 810 on the main antenna 805. The tunable matching network 810 coupled with the main antenna has both transmit and receive signals, and can be optimized for Tx performance, Rx performance, and Duplex performance. For the Tx solution, Vout can be maximized For the Rx solution and the Duplex solution, dVout can be included in the Figure of Merit. A PTC preference may be required to identify the optimal Rx solution but is not required to identify the optimal duplex solution, return loss, received power, current drain or transmitter linearity In one or more exemplary embodiments, the Figure of Merit may be constructed such that when it equals a certain value, or is minimized or maximized, the desired tuner settings are achieved. The Figure of Merit may be used with a number of different optimization algorithms. For example, a more exhaustive approach may be used that evaluates the Figure of Merit at every combination of capacitor values. Other suitable algorithms can also be utilized, including a simplex algorithm, a binary search algorithm, and/or a gradient algorithm.

In another embodiment, communication device 800 can tune antennas 805 and 820 without using detectors 815 and 830. The tunable matching network 810 can be adjusted using several different methods, some of which were disclosed in U.S. Patent Application Publication US 2009/0121963. After the tunable matching network 810 is adjusted, the tunable matching network 825 can be adjusted. By monitoring the detector 801 coupled to the directional coupler 875, the diversity match tuning state can be determined which adjusts the tunable matching network 825 to the transmit frequency. If significant coupling between the two antennas 805 and 820 is assumed, and by monitoring the return loss of the transmit/receive match while adjusting the diversity reception antenna 820 match during transmitting, the diversity match tuning state can be determined which tunes the diversity reception antenna 820 to the transmit frequency. This tuning state can minimize the return loss at the transmit frequency as measured at the directional coupler 875. After finding this tuning state the tunable matching network 825 can then be adjusted (e.g., offset) appropriately for the receive frequency.

Figure 9:
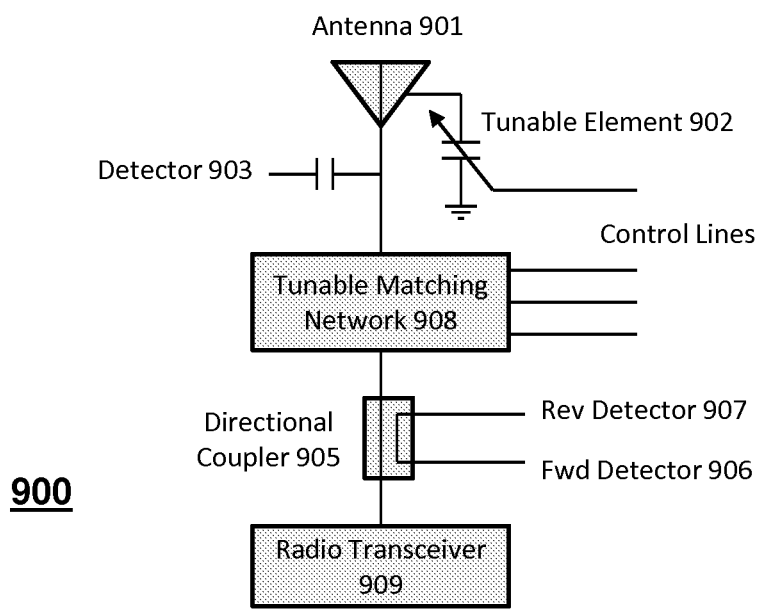
FIGS. 9-16 depict illustrative embodiments of portions of communication devices.

In another embodiment depicted in FIG. 9, communication device 900 includes tunable element 902 for tuning antenna 901. The tuning can be in an open-loop manner, such as based on frequency and/or use case. Tunable element 902 can be adjusted such that the antenna VSWR is in a range that can be reasonably matched by tunable matching network 908.

Tunable element 902 can be adjusted in an open-loop manner to maximize rejection or attenuation at an unwanted frequency while maintaining the VSWR at the fundamental frequency in the range that can be reasonably matched by the tunable matching network 908. The unwanted frequency may be a harmonic or an interferer. Matching network 908 can be tuned in a closed-loop manner, such as based on operational parameter(s) collected from detector 903 and/or directional coupler 905 having forward and reverse detectors 906, 907 positioned between the matching network 908 and the transceiver 909.

Figure 10:
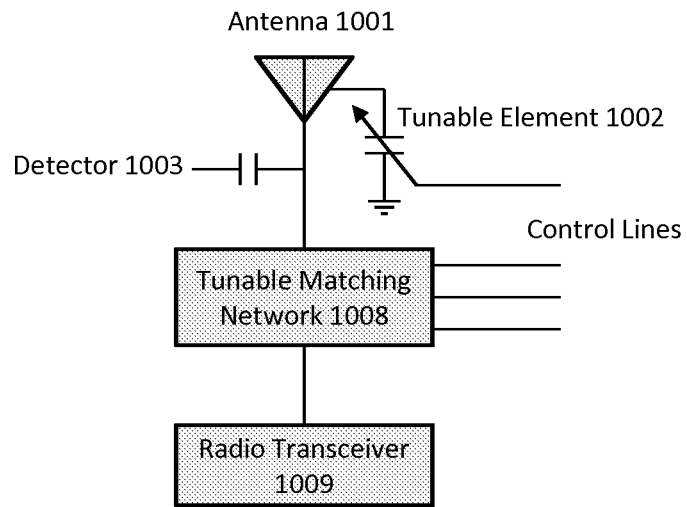

In another embodiment depicted in FIG. 10, communication device 1000 includes tunable element 1002 for tuning antenna 1001 in an open-loop manner based on frequency and/or use case. Tunable element 1002 can be tuned such that the antenna VSWR is in the range that can be reasonably matched by tunable matching network 1008, and the on-antenna tuning can maximize rejection or attenuation at an unwanted frequency while maintaining a VSWR at the fundamental frequency in the range that can be reasonably matched by tunable matching network 1008. The tunable matching network can be tuned based on metrics gathered from detector 1003 without utilizing measurements from any measuring device in between the matching network and the transceiver 1009.

Figure 11:
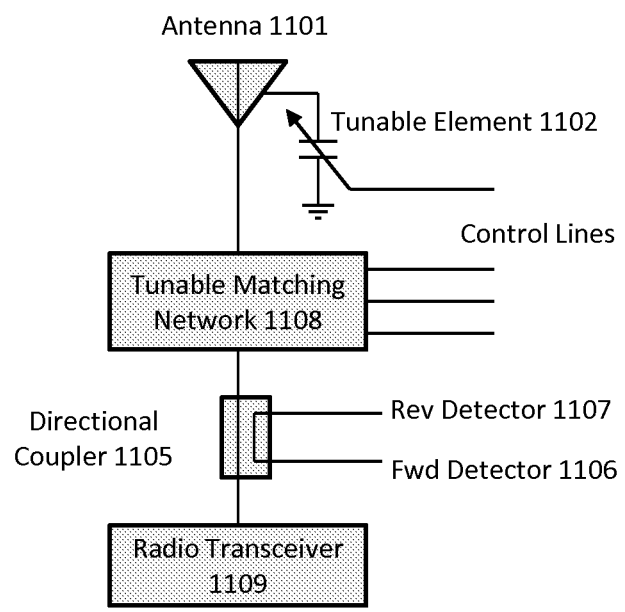

In another embodiment depicted in FIG. 11, communication device 1100 includes tunable element 1102 for tuning antenna 1101 in a closed loop manner while also tuning the matching network 1108 in a closed-loop manner. A directional coupler 1105 having forward and reverse detectors 1106, 1107 can be connected between the matching network 1108 and a transceiver 1109 for obtaining operational parameter(s) for performing the closed loop tuning of element(s) 1102 and matching network 1108. Tuning can be performed in this embodiment without obtaining measurements from a measuring component in proximity to the antenna.

Figure 12:
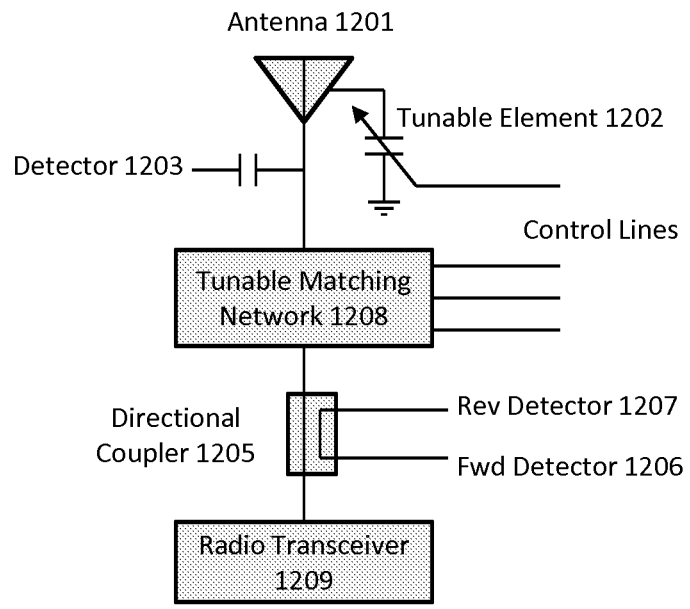

In another embodiment depicted in FIG. 12, communication device 1200 includes tunable element 1202 for tuning antenna 1201 in a closed loop manner based on maintaining the RF voltage present at detector 1203 in a preset range relative to the transmit power. This can establish an antenna impedance that is in the range that can be reasonably matched by tunable matching network 1208. Matching network 1208 can be tuned in a closed loop manner based on operational parameter(s) obtained using directional coupler 1205 having forward and reverse detectors 1206, 1207 coupled with the device 1200 between the matching network and the transceiver 1209.

Figure 13:
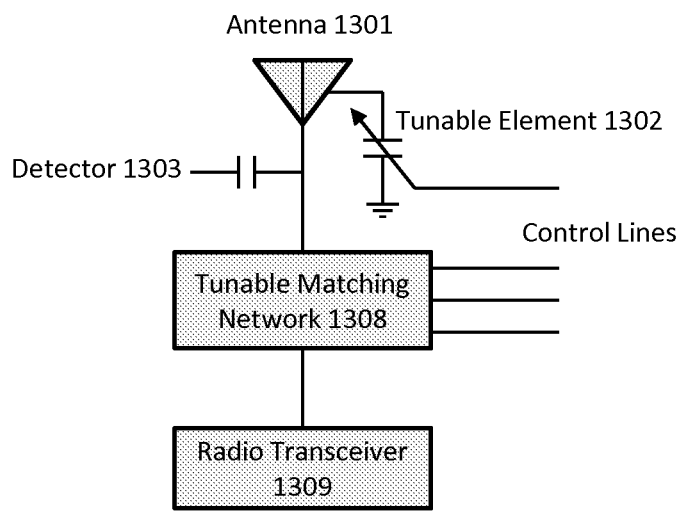

In another embodiment depicted in FIG. 13, communication device 1300 includes tunable element 1302 for tuning antenna 1301 in a closed loop manner based on the RF voltage obtained at detector 1303, such as maintaining the RF voltage in a preset range relative to the transmit power. Matching network 1308 can be tuned in a closed loop manner based on operational parameter(s) obtained using detector 1303 without obtaining measurements from any measuring components coupled between the matching network 1308 and the transceiver 1309.

Figure 14:
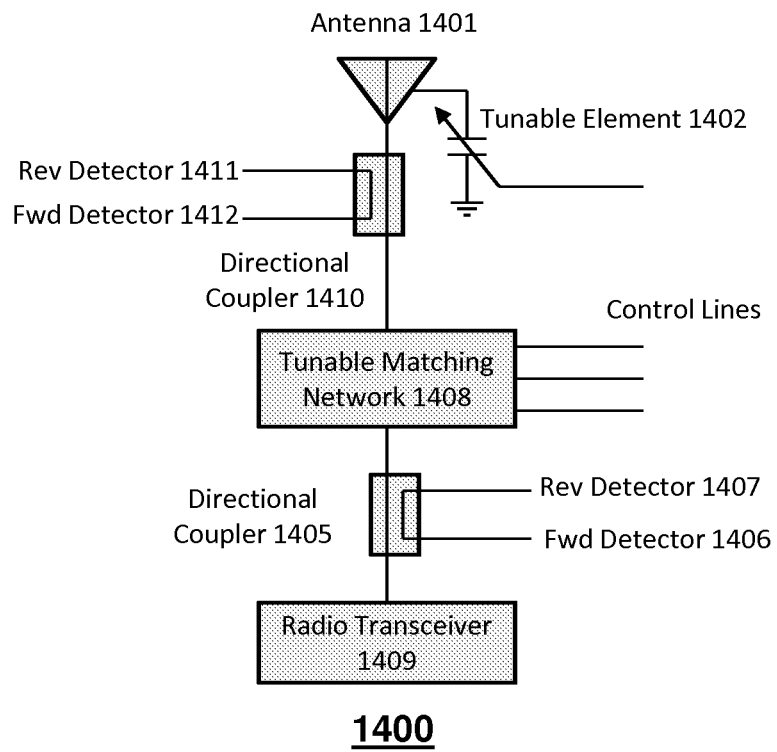

In another embodiment depicted in FIG. 14, communication device 1400 includes tunable element 1402 for tuning antenna 1401 in a closed loop manner by placing the antenna VSWR detected using directional coupler 1410 with forward and reverse detectors 1411, 1412 in a preset range. This will establish an antenna VSWR that is in the range which can then be reasonably matched by tunable matching network 1408. Within the acceptable range of the antenna VSWR, the solution can be biased using a tuning preference for on-antenna element 1402 to achieve a second criteria. Matching for the element 1402 can be performed at the Rx frequency and/or based on achieving linearity. The matching network 1408 can be tuned in a closed loop manner based on operational parameter(s) obtained from the directional coupler 1405 having forward and reverse detectors 1406, 1407 positioned between the matching network and the transceiver 1409.

Figure 15:
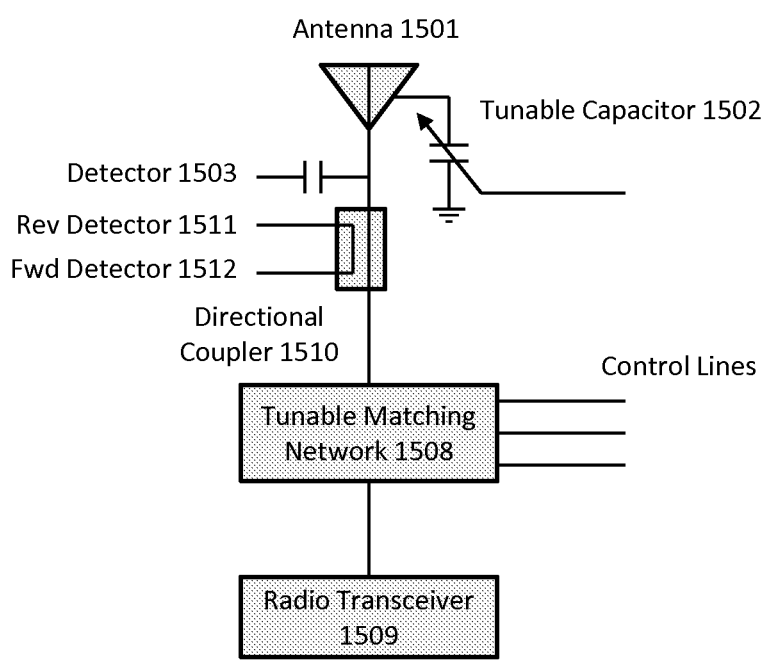

In another embodiment depicted in FIG. 15, communication device 1500 includes tunable element 1502 for tuning antenna 1501 in a closed loop manner by placing the antenna VSWR detected using directional coupler 1510 with forward and reverse detectors 1511, 1512 in a preset range. This will establish an antenna VSWR that is in the range which can then be reasonably matched by tunable matching network 1508. Within the acceptable range of the antenna VSWR, the solution can be biased using a tuning preference for on-antenna tunable element 1502 to achieve a second criteria. Matching for the element 1502 can be performed at the Rx frequency and/or based on achieving linearity. The matching network 1508 can be tuned in a closed loop manner based on operational parameter(s) obtained from the detector 1503 coupled in proximity to the antenna 1501 without obtaining measurements from any measuring component positioned between the matching network and the transceiver 1509.

Figure 16:
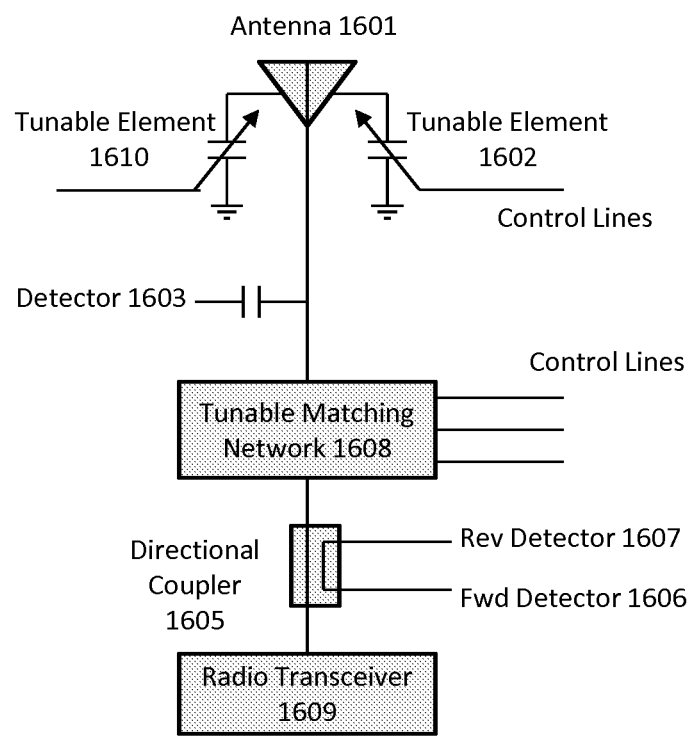

In another embodiment depicted in FIG. 16, communication device 1600 includes an antenna 1601 that includes two radiating elements which cover different frequency ranges, tunable element 1602 and tunable element 1610 for tuning antenna 1601. Tunable element 1602 can primarily affect a first frequency range or band and tunable element 1610 can primarily affect the second frequency range or band of the antenna 1601. Tunable element 1602 can be adjusted in an open-loop manner based on frequency and/or use case. Tunable element 1602 can be adjusted such that the antenna VSWR as determined or otherwise estimated from metrics of the detector 1603 and with knowledge of the transmitter output power is in a range that can be reasonably matched by tunable matching network 1608. Tunable element 1610 can be adjusted in an open-loop manner to maximize rejection or attenuation at an unwanted frequency while maintaining a VSWR at the fundamental frequency in the range that can be reasonably matched by tunable matching network 1608. The unwanted frequency may be a harmonic, such as in the High Band, while the fundamental (TX & RX) frequencies can be in the Low Band. Matching network 1608 can be tuned in a closed loop manner utilizing operational parameter(s) obtained from the directional coupler 1605 having forward and reverse detectors 1606, 1607 coupled between the matching network and the transceiver 1609.

Another embodiment provides for tuning one or more of the antennas of a communication device. In a multiple antenna system, simply maximizing the over the air efficiency of all the antennas may not accomplish the best overall performance of the communication system. The isolation or de-correlation between antennas in a small handset can also be a key parameter in defining the overall performance in certain instances. A control method that considers the efficiency of both antennas and the isolation between them can be advantageous. For example, in an antenna diversity system, the antennas can be tuned so as to reduce coupling between the antennas without degrading the efficiency of either antenna, or to degrade efficiency minimally such that overall system performance is enhanced. Thus, even for closely spaced antennas in a handheld mobile application, the coupling may be reduced or otherwise kept to a minimum in spite of antenna proximity. Other parameters other than antenna cross-coupling may also be optimized to improve overall performance of the system, such as in a MIMO system where there can be simultaneously multiple output antennas and multiple input antennas.

Figure 17:
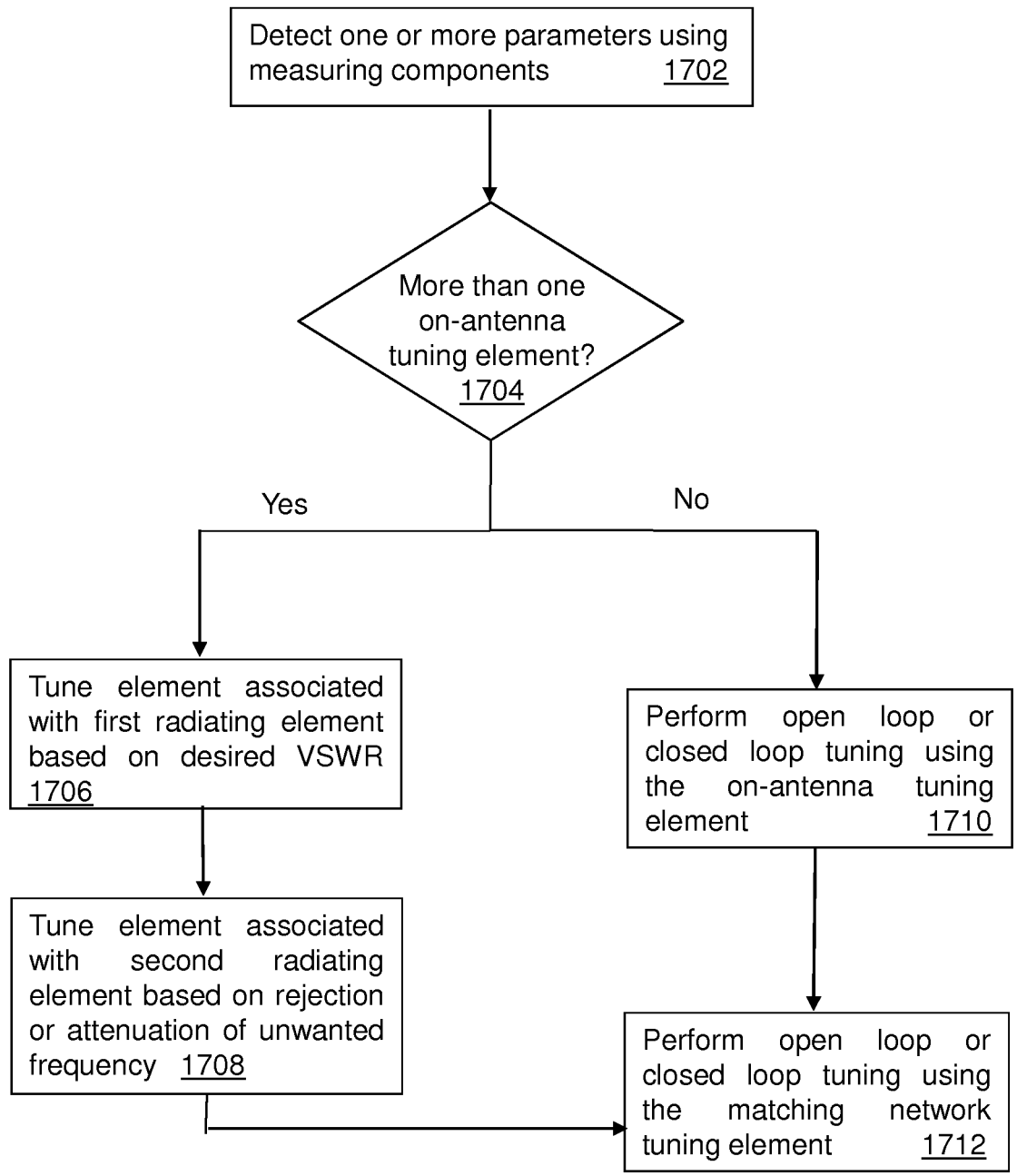
FIG. 17 depicts an exemplary method operating in portions of one or more of the devices of FIGS. 1-16.

FIG. 17 depicts an exemplary method 1700 operating in portions of one or more of the devices of FIGS. 1-16. Method 1700 can be utilized with communication devices of various configurations, including multiple antenna devices. Method 1700 can begin with step 1702 by detecting one or more parameters of the communication device, such as parameters associated with transmitting that are obtained through use of measuring components including a detector and/or a directional coupler. The number and positioning of the measuring components can vary and can be in proximity to the antenna and/or between a matching network and a transceiver.

In step 1704, it can be determined whether there are multiple on-antenna tuning elements. If there are more than one such tuning elements then in step 1706 tuning elements associated with a radiating element(s) can be tuned based on a desired VSWR at a frequency of operation. In step 1708, tuning elements associated with another radiating element(s) can be tuned based on a different factor, such as a rejection or attenuation of an unwanted frequency. If on the other hand, there is only one on-antenna tuning element and/or the tuning elements are only connected with one of the radiating elements of the antenna then method 1700 can proceed to step 1710 where the on-antenna tuning element(s) is tuned using an open loop and/or closed loop process. The open loop process can utilize various factors to determine tuning, including use case, operating frequency, proximity information accelerometer/position information, and so forth. The closed loop process can utilize various factors to determine tuning, including RF voltage, return loss, received power, current drain and/or transmitter linearity In step 1712, tuning can be performed utilizing the matching network. The tuning of the matching network can be an open loop and/or closed loop process, including using one or more of the factors described above with respect to the open and closed loop processes that can tune the on-antenna tuning elements. The timing of the tuning utilizing the matching network can vary, including being performed simultaneously with tuning of the on-antenna tuning elements, after tuning of the on-antenna tuning elements and/or before tuning of the on-antenna tuning elements. Method 1700 can be an iterative process that tunes the on-antenna tuning elements and/or the matching network.

In one embodiment, the tuning of the matching network(s) can be performed in combination with look-up tables such as shown in FIG. 18. For instance, one or more desirable performance characteristics of a communication device 100 can be defined in the form of Figures of Merits (FOMs), the communication device can be adapted to find a range of tuning states that achieve the desired FOMs by sweeping a mathematical model in fine increments to find global optimal performance with respect to the desired FOMs. In one embodiment, look-up table 1800 can be indexed (e.g., by the controller 106 of the communication device 100 of FIG. 1) during operation according to band and/or use case.

From the foregoing descriptions, it would be evident to an artisan with ordinary skill in the art that the aforementioned embodiments can be modified, reduced, or enhanced without departing from the scope and spirit of the claims described below. For example, detector 830 may include a directional coupler for the diversity antenna to compensate for out-of-band impedance of the Rx filter that may create a very high standing wave on the feed line and put voltage nulls at unpredictable places on the line (including at the base of the antenna).

In another embodiment, combinations of open and closed loop processes can be utilized for tuning of one or more of the tunable elements of the antenna and/or the matching network. For instance, a tunable element of the antenna can be tuned in part with a closed loop process based on an operational parameter of the communication system and in part with an open loop process based on a use case and/or location information of the communication device. In another embodiment, the use of closed loop and open loop processes can be alternated or otherwise arranged in being applied to a particular tunable element, such as initially applying an open loop process but then later applying a closed loop process, including switching from an open loop to a closed loop process based on operational parameters of the communication device. In another embodiment, the matching network can be tuned in whole or in part using an open loop process, such as based on a use case provided in a look-up table and/or based on location information associated with the communication device.

The exemplary embodiments can employ open loop tuning processes, such as at the on-antenna tunable element and/or at the matching network. The use cases can include a number of different states or status associated with the communication device, such as flip-open, flip-closed, slider-in, slider-out (e.g., Qwerty or numeric Keypad), speaker-phone on, speaker-phone off, hands-free operation, antenna up, antenna down, other communication modes on or off (e.g., Bluetooth/WiFi/GPS), particular frequency band, and/or transmit or receive mode. The use case can be based on object or surface proximity detection (e.g., a user's hand or a table). Other environmental effects can be included in the open loop process, such as temperature, pressure, velocity and/or altitude effects. The open loop process can take into account other information, such as associated with a particular location (e.g., in a building or in a city surrounded by buildings), as well as an indication of being out of range. The exemplary embodiments can utilize combinations of open loop and closed loop processes, such as tuning a tunable element based on both a use case and a measured operating parameter (e.g., measured by a detector in proximity to the antenna and/or measured by a directional coupler between the matching network and the transceiver). In other examples, the tuning can utilize one process and then switch to another process, such as using closed loop tuning and then switching to open loop tuning based on particular factors associated with the communication device. The use case can be based on the knowledge of transmitter power level setting and receiver received signal strength, current drain, accelerometer direction/orientation, and any other information that is available within the device (e.g., a handset, tablet, or other wireless communication device) indicative of operating modes or use case.

In one embodiment, Low Band (LB) radiating element(s) and High Band (HB) radiating element(s) can be utilized with the antenna, where at least one tunable element is associated with the LB radiating element is tuned based on a desired Voltage Standing Wave Ratio (VSWR) associated with the antenna, and wherein at least another tunable elements that is associated with the HB radiating element is tuned based on a different performance metric. The different performance metric can be based on attenuation of an undesired frequency. As an example, the undesired frequency can be a harmonic frequency or can be associated with an interferer.

Methodologies and/or components that are described herein with respect to tuning of one tunable element can also be utilized with respect to tuning of other tunable elements. For example, derivative information utilized for tuning the matching network can be used for tuning of on-antenna tunable elements.

Other suitable modifications can be applied to the present disclosure. Accordingly, the reader is directed to the claims for a fuller understanding of the breadth and scope of the present disclosure.

Figure 19:
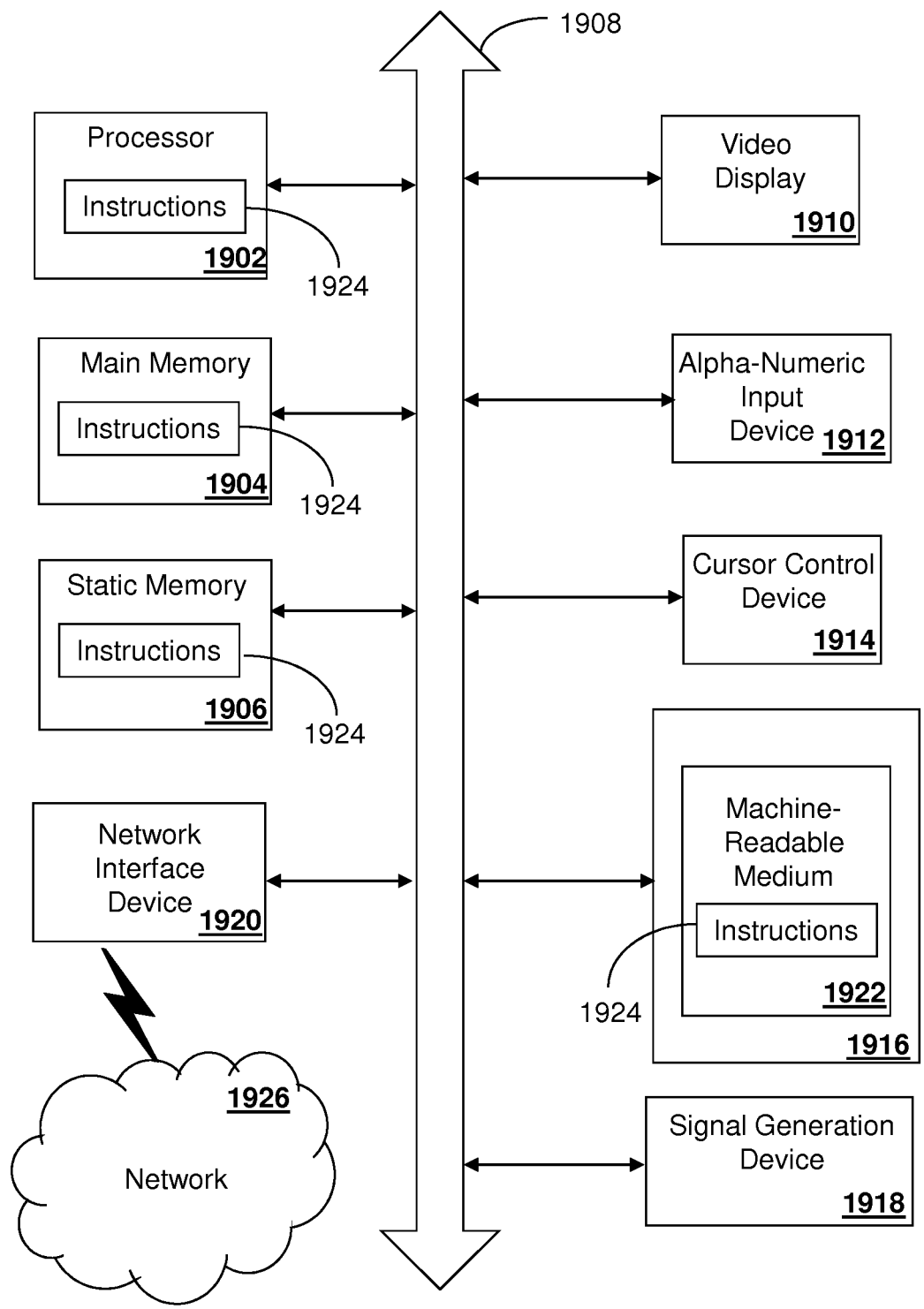
FIG. 19 depicts an exemplary diagrammatic representation of a machine in the form of a computer system within which a set of instructions, when executed, may cause the machine to perform any one or more of the methodologies disclosed herein.

FIG. 19 depicts an exemplary diagrammatic representation of a machine in the form of a computer system 1900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1900 may include a processor 1902 (e.g., a central processing unit (CPU), a graphics processing unit (GPU, or both), a main memory 1904 and a static memory 1906, which communicate with each other via a bus 1908. The computer system 1900 may further include a video display unit 1910 (e.g., a liquid crystal display (LCD), a flat panel, a solid state display, or a cathode ray tube (CRT)). The computer system 1900 may include an input device 1912 (e.g., a keyboard), a cursor control device 1914 (e.g., a mouse), a disk drive unit 1916, a signal generation device 1918 (e.g., a speaker or remote control) and a network interface device 1920.

The disk drive unit 1916 may include a machine-readable medium 1922 on which is stored one or more sets of instructions (e.g., software 1924) embodying any one or more of the methodologies or functions described herein, including those methods illustrated above. The instructions 1924 may also reside, completely or at least partially, within the main memory 1904, the static memory 1906, and/or within the processor 1902 during execution thereof by the computer system 1900. The main memory 1904 and the processor 1902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1924, or that which receives and executes instructions 1924 from a propagated signal so that a device connected to a network environment 1926 can send or receive voice, video or data, and to communicate over the network 1926 using the instructions 1924. The instructions 1924 may further be transmitted or received over a network 1926 via the network interface device 1920.

While the machine-readable medium 1922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A tuning system for a communication device having an antenna, the tuning system comprising:
   at least one first tunable element connected with at least one radiating element of the antenna for tuning the antenna, wherein adjusting of the at least one first tunable element is based on a use case associated with the communication device; and
   a matching network having at least one second tunable element coupled to a feed point of the antenna, wherein the matching network receives control signals for adjusting the at least one second tunable element to tune the matching network,
   wherein the adjusting of the at least one second tunable element of the matching network comprises a closed loop process, wherein the at least one first tunable element is a plurality of first tunable elements, wherein the at least one radiating element comprises a first radiating element associated with a first frequency range and a second radiating element associated with a second frequency range, wherein at least one of the plurality of first tunable elements that is associated with the first radiating element is tuned based on a desired Voltage Standing Wave Ratio (VSWR) associated with the antenna, and wherein at least another of the plurality of first tunable elements that is associated with the second radiating element is tuned based on a different performance metric.

2. The tuning system of claim 1, wherein tuning parameters for the use case associated with the communication device are stored in a look-up table of the communication device.

3. The tuning system of claim 1, wherein the use case comprises at least one of an earpiece speaker status, a speakerphone status, a headset status, and a slider status.

4. The tuning system of claim 1, wherein the use case comprises position information obtained from at least one of an accelerometer and a proximity detector of the communication device.

5. The tuning system of claim 1, wherein the closed loop process includes obtaining an operational parameter using a directional coupler connected between the antenna and a transceiver of the communication device.

6. The tuning system of claim 5, wherein the operational parameter is obtained during transmission by the transceiver of the communication device.

7. The tuning system of claim 1, wherein the closed loop process includes obtaining an operational parameter using a detector coupled between the antenna and the matching network without using a measuring component coupled between the matching network and a transceiver of the communication device.

8. The tuning system of claim 1, wherein the closed loop process includes obtaining an operational parameter using a directional coupler coupled between the matching network and a transceiver of the communication device.

9. The tuning system of claim 1, wherein the different performance metric is based on attenuation of an undesired frequency.

10. The tuning system of claim 9, wherein the undesired frequency is a harmonic frequency.

11. The tuning system of claim 9, wherein the undesired frequency is associated with an interferer.

12. The tuning system of claim 11, wherein at least a portion of the plurality of first tunable elements are adjusted based on first metrics obtained from a detector coupled in proximity to the antenna, and wherein the adjusting of the at least one second tunable element is based on second metrics obtained from a directional coupler.

13. The tuning system of claim 1, wherein at least a portion of the at least one first tunable element and the at least one second tunable element is electrically tunable capacitors.

14. The tuning system of claim 13, wherein Low Band (LB) radiating elements of the antenna are tuned using a different process than is utilized in tuning High Band (HB) radiating elements of the antenna.

15. A tuning system for a communication device having an antenna, the tuning system comprising:
at least one first tunable element connected with at least one radiating element of the antenna for tuning the antenna, wherein adjusting of the at least one first tunable element is based on a use case associated with the communication device; and
a matching network having at least one second tunable element coupled to a feed point of the antenna, wherein the matching network receives control signals for adjusting the at least one second tunable element to tune the matching network,
wherein the adjusting of the at least one second tunable element of the matching network comprises a closed loop process,
wherein the at least one first tunable element is a plurality of first tunable elements,
wherein the at least one radiating element comprises a Low Band (LB) radiating element and a High Band (HB) radiating element,
wherein at least one of the plurality of first tunable elements that is associated with the LB radiating element is tuned based on a desired Voltage Standing Wave Ratio (VSWR) associated with the antenna, and
wherein at least another of the plurality of first tunable elements that is associated with the HB radiating element is tuned based on a different performance metric.

16. The tuning system of claim 15, wherein the different performance metric is based on attenuation of an undesired frequency, and wherein the undesired frequency is associated with one of a harmonic frequency and an interferer.

17. A method comprising:
tuning, by a controller, an antenna of a communication device by adjusting at least one first tunable element of the communication device that is connected with at least one radiating element of the antenna, wherein the adjusting of the at least one first tunable element is based on a use case associated with the communication device, wherein the at least one first tunable element is a plurality of first tunable elements, wherein the at least one radiating element comprises a first radiating element associated with a first frequency range and a second radiating element associated with a second frequency range;
tuning, by the controller, a matching network of the communication device by adjusting at least one second tunable element of the matching network that is coupled between the antenna and a transceiver of the communication device, wherein the adjusting of the second tunable element comprises a closed loop process based on an operational parameter of the communication device;
tuning, by the controller, at least one of the plurality of first tunable elements that is associated with the first radiating element based on a first performance metric; and
tuning, by the controller, at least another of the plurality of first tunable elements that is associated with the second radiating element based on a second performance metric that is different from the first performance metric.

18. The method of claim 17, wherein tuning parameters for the use case associated with the communication device is stored in a look-up table of the communication device, and wherein the use case comprises at least one of an earpiece speaker status, a speakerphone status, a headset status, and a slider status.

19. The method of claim 17, comprising obtaining the operational parameter of the communication device using a detector coupled between the antenna and the matching network without using a measuring component coupled between the matching network and the transceiver.

20. The method of claim 17, comprising obtaining the operational parameter of the communication device using a directional coupler coupled between the matching network and the transceiver without using a measuring component between the antenna and the matching network.

21. The method of claim 17, wherein the first performance metric is based on a desired Voltage Standing Wave Ratio (VSWR) associated with the antenna.

22. The method of claim 21, wherein the first radiating element is a low band radiating element, and wherein the second radiating element is a high band radiating element.

* * * * *